United States Patent
Li et al.

(10) Patent No.: US 12,109,755 B2
(45) Date of Patent: Oct. 8, 2024

(54) ADDITIVE MANUFACTURING PROCESS OF A MOULD USING MICROWAVE RADIATION, MICROWAVE PRINTING DEVICE AND ADDITIVE PRINTING DEVICE FOR 3D PRINTING OF A FILAMENT COMPRISING A FIBRE COMPOSITE MATERIAL

(71) Applicant: Karlsruher Institut für Technologie, Karlsruhe (DE)

(72) Inventors: Nanya Li, Stutensee (DE); Guido Link, Walzbachtal (DE); John Jelonnek, Ulm (DE)

(73) Assignee: Karlsruher Institut für Technologie, Karlsruhe (DE)

( * ) Notice: Subject to any disclaimer, the term of this patent is extended or adjusted under 35 U.S.C. 154(b) by 415 days.

(21) Appl. No.: 17/440,592

(22) PCT Filed: Mar. 20, 2020

(86) PCT No.: PCT/EP2020/057743
§ 371 (c)(1),
(2) Date: Sep. 17, 2021

(87) PCT Pub. No.: WO2020/188075
PCT Pub. Date: Sep. 24, 2020

(65) Prior Publication Data
US 2022/0193994 A1 Jun. 23, 2022

(30) Foreign Application Priority Data
Mar. 20, 2019 (DE) .................... 10 2019 001 976.8

(51) Int. Cl.
*B29C 64/209* (2017.01)
*B22F 12/00* (2021.01)
(Continued)

(52) U.S. Cl.
CPC ............ *B29C 64/118* (2017.08); *B22F 12/10* (2021.01); *B22F 12/224* (2021.01); *B22F 12/53* (2021.01);
(Continued)

(58) Field of Classification Search
CPC . B29C 33/3842; B29C 64/209; B29C 64/118; B29C 64/295; B29C 35/0805;
(Continued)

(56) References Cited

U.S. PATENT DOCUMENTS 5,948,194 A  9/1999  Hill et al.
6,114,676 A  9/2000  Jerby et al.
(Continued)

FOREIGN PATENT DOCUMENTS

DE  102015002967 A1  10/2016
EP    2916618 A1   9/2015
(Continued)

OTHER PUBLICATIONS

Jerby, E., et al., "Incremental metal-powder solidification by localized microwave-heating and its potential for additive manufacturing," Additive Manufacturing, vol. 6, pp. 53-66 (2015).
(Continued)

*Primary Examiner* — Monica A Huson
(74) *Attorney, Agent, or Firm* — Shook, Hardy & Bacon L.L.P.

(57) ABSTRACT

A microwave printing device comprising an inlet for a filament 1 of an electrically conductive material, an outlet for the filament and a microwave heating device 4 for heating the filament 1 by means of microwave radiation. The microwave heating device 4 comprises at least one coaxial resonator. The coaxial resonator is formed by an outer conductor, which forms a cavity 11, and a coaxial inner conductor. The coaxial resonator also comprises a micro-
(Continued)

Figure 1:
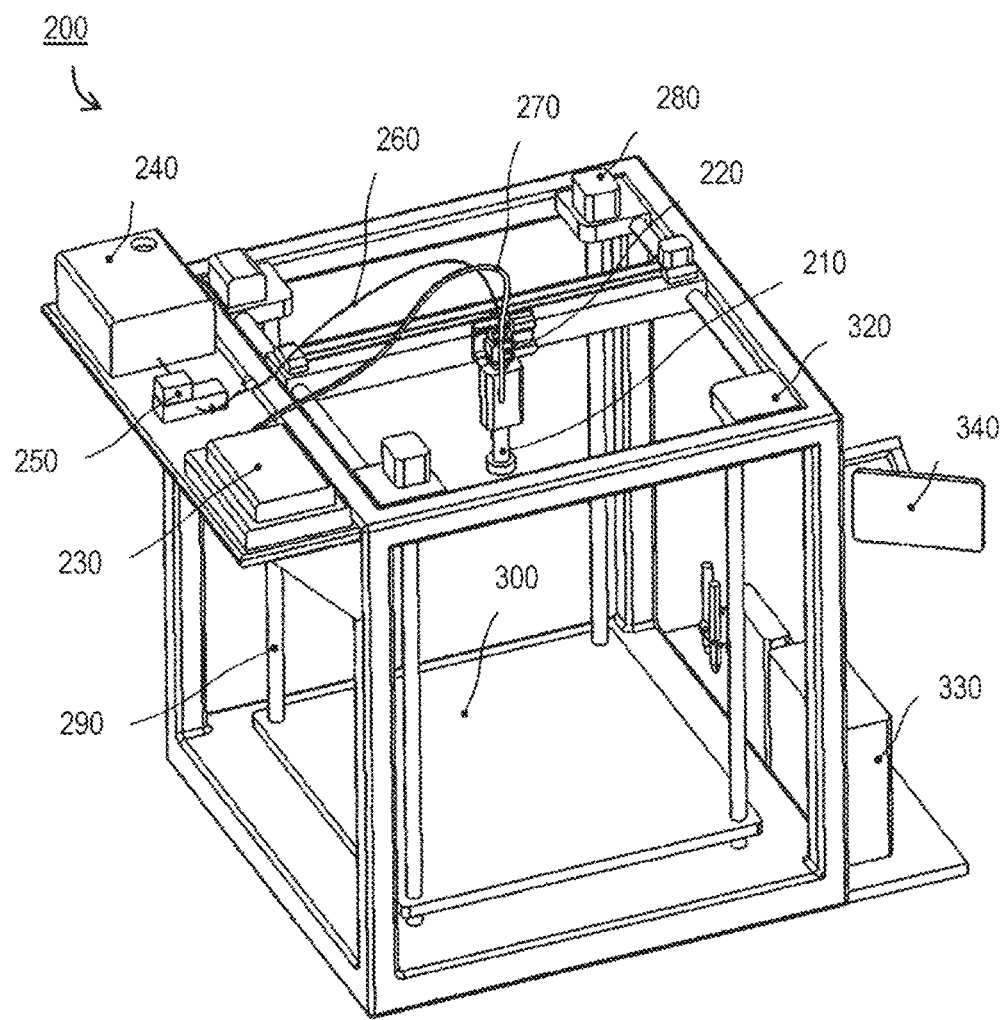

wave radiation input for coupling in microwave radiation. The filament 1 preferably forms the inner conductor or part of the inner conductor of the resonator. A system for the additive manufacture of moulds, comprising the microwave printing device, and a process for the additive manufacture of moulds with the aid of the microwave printing device.

18 Claims, 14 Drawing Sheets

(51) Int. Cl.
*B22F 12/10* (2021.01)
*B22F 12/53* (2021.01)
*B29C 33/38* (2006.01)
*B29C 35/08* (2006.01)
*B29C 64/118* (2017.01)
*B33Y 10/00* (2015.01)
*B33Y 30/00* (2015.01)
B22F 12/90 (2021.01)
B29K 105/08 (2006.01)
B29L 31/00 (2006.01)

(52) U.S. Cl.
CPC ...... *B29C 33/3842* (2013.01); *B29C 35/0805* (2013.01); *B29C 64/209* (2017.08); *B33Y 10/00* (2014.12); *B33Y 30/00* (2014.12); B22F 12/90 (2021.01); B29C 2035/0855 (2013.01); B29K 2105/08 (2013.01); B29K 2995/0005 (2013.01); B29L 2031/757 (2013.01)

(58) Field of Classification Search
CPC ........... B29C 2035/0855; B22F 12/224; B22F 12/10; B22F 12/53; B22F 3/20; B22F 12/90; B22F 2003/1054; B22F 2999/00; B33Y 10/00; B33Y 30/00; B33Y 40/00; H05B 6/80; H05B 6/702; B29K 2105/08; B29K 2995/0005; B29L 2031/757; Y02P 10/25

See application file for complete search history.

(56) References Cited

U.S. PATENT DOCUMENTS

| | | |
|---|---|---|
| 9,578,695 B2 | 2/2017 | Jerby et al. |
| 2017/0266728 A1 | 9/2017 | Johnson et al. |
| 2017/0282400 A1* | 10/2017 | Jie .................... B28B 1/001 |

FOREIGN PATENT DOCUMENTS

| | | |
|---|---|---|
| EP | 3124213 A1 | 1/2017 |
| KR | 20140001287 A | 1/2014 |
| WO | 2012/127456 A1 | 9/2012 |
| WO | 2020188075 A1 | 9/2020 |

OTHER PUBLICATIONS

Office Action received for German Patent Application No. 102019001976.8 , mailed on Dec. 20, 2021, 10 pages.

* cited by examiner

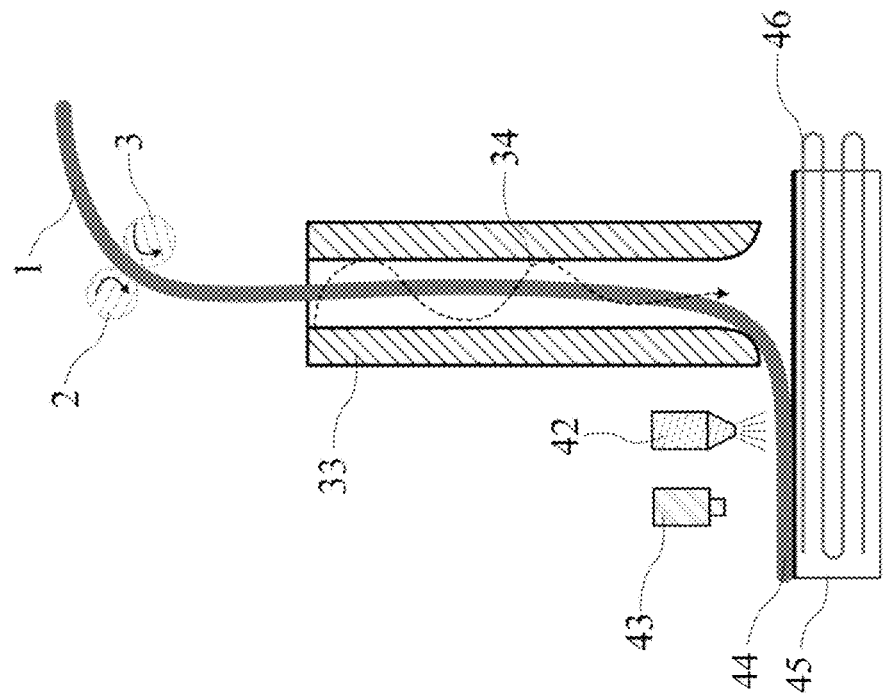
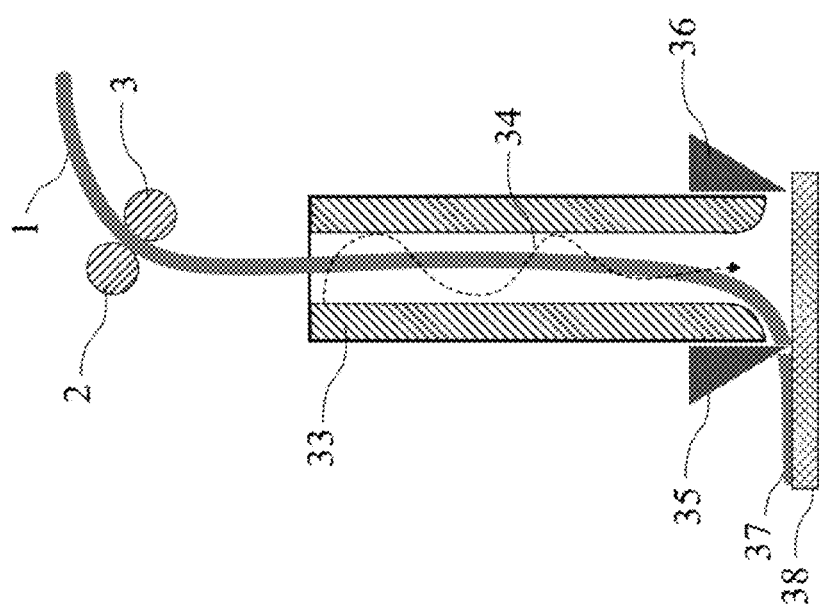

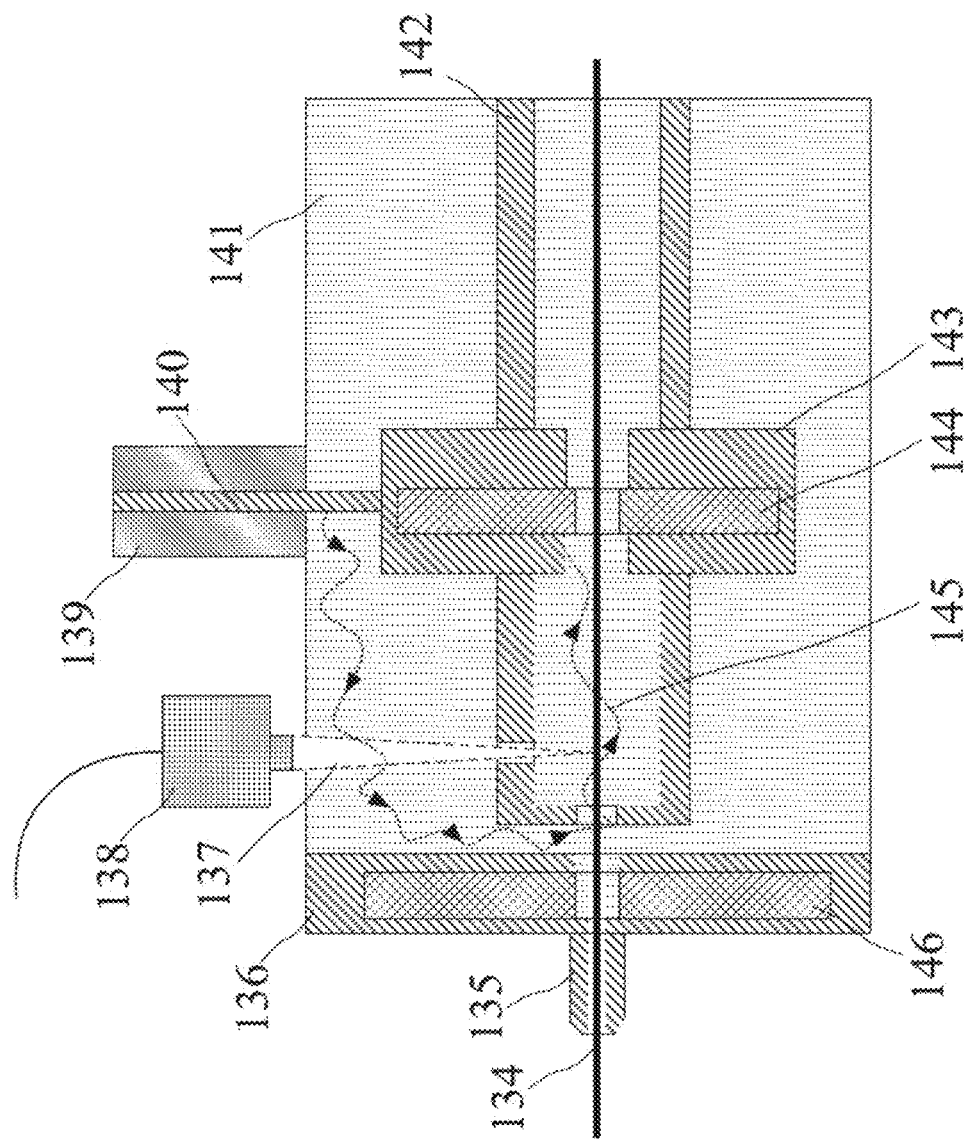
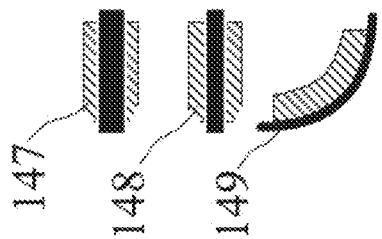
Fig. 13

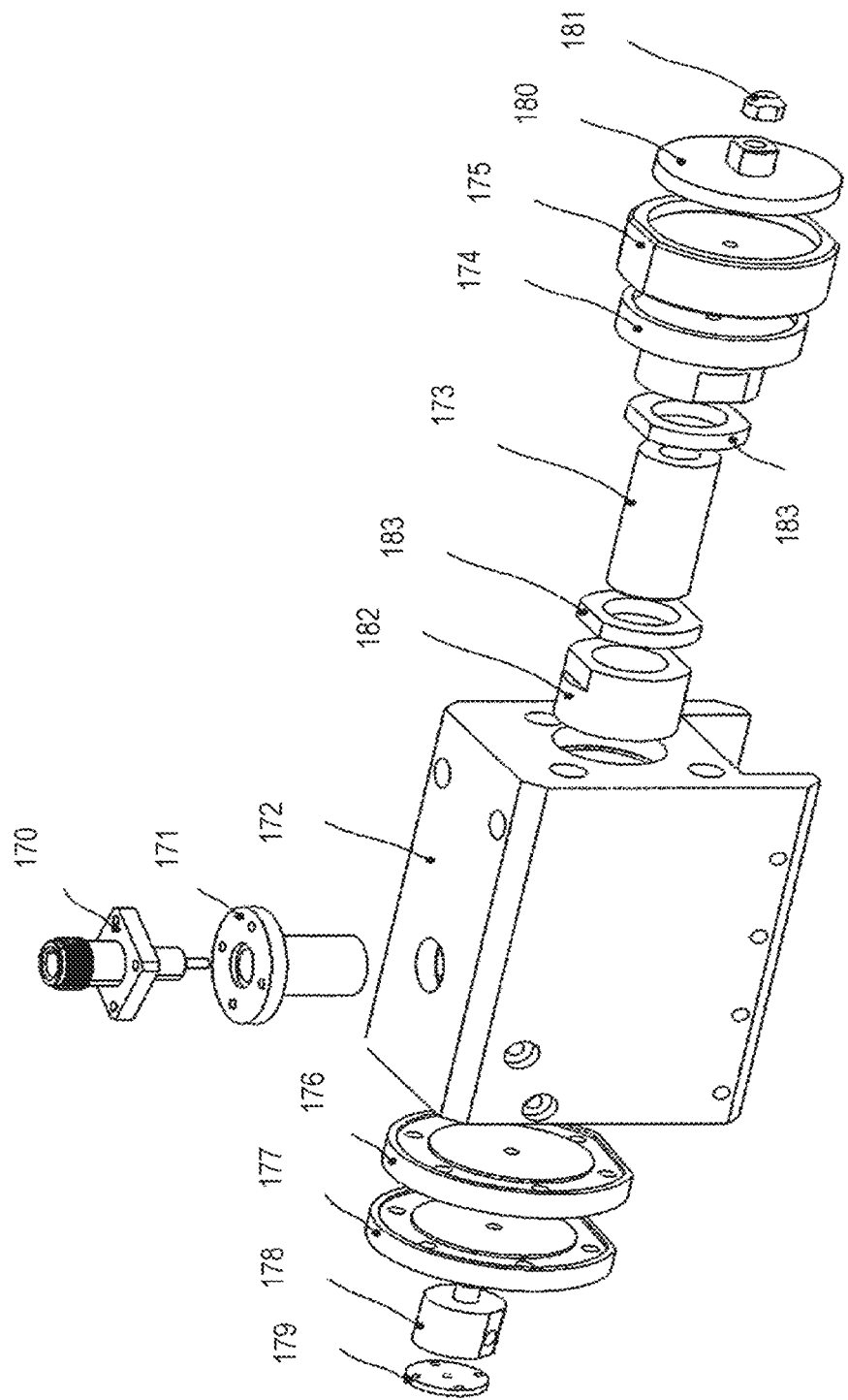

ADDITIVE MANUFACTURING PROCESS OF A MOULD USING MICROWAVE RADIATION, MICROWAVE PRINTING DEVICE AND ADDITIVE PRINTING DEVICE FOR 3D PRINTING OF A FILAMENT COMPRISING A FIBRE COMPOSITE MATERIAL

CROSS-REFERENCE TO RELATED APPLICATIONS AND PRIORITY CLAIM

This non-provisional patent application is a 371 national phase that claims priority to co-pending PCT/EP2020/057743, filed on Mar. 20, 2020, titled "Additiver Herstellungsprozess einer Form unter Verwendung von Mikrowellenstrahlung, Mikrowellendruckvorrichtung und additive Druckvorrichtung für 3D-Druck eines einen Faserverbundwerkstoff umfassenden Filaments," which claims priority to German Patent Application No. 10 2019 001 976.8, filed on Mar. 20, 2019. The contents of both of the aforementioned applications are incorporated herein by reference in the entirety.

The present invention relates to a microwave printing device, a system for the additive manufacture of molds comprising the microwave printing device, and an additive manufacturing process of a mold using microwave radiation.

Fiber-reinforced polymer composites are materials that combine polymer materials with fibers, with the polymer material forming a matrix and being reinforced by the fibers. Carbon fiber-reinforced polymer composites contain carbon fibers as fibers. Today, large amounts of fiber-reinforced composite parts are used in the fields of aerospace engineering, transportation, clean energy, and sports because of their clear advantages of high strength, low density, long service life, and corrosion resistance in a demanding environment.

Because of its good adaptability, the traditional autoclave curing technology allows producing a large number of composite parts with different shapes, simple manufacturing processes and good reproducibility. However, this traditional technology entails a very long curing cycle and high energy consumption. For example, the curing time for a high-performance composite component of an aircraft can exceed 24 hours and the average power consumption of a 14 m long autoclave with a diameter of 5 m can be more than 2500 kW/h. After 24 hours, the power consumption is 60,000 kW or more, which corresponds to the power consumption of a family in 17 years.

Furthermore, a new mold tool is required for every change in the component design or for every differently shaped part. Usually, the manufacture of such a mold is very expensive and time-consuming.

These disadvantages also affect corresponding manufacturing processes for fiber-reinforced composite parts for other fields. Therefore, the development of this technology has been restricted because of the length of time, cost, and inflexibility with regard to shape.

Additive manufacturing processes, also known as "3D printing", often use thermoplastics or polymer resins.

In an additive manufacturing process, a mold or an object is additively, i.e. by depositing material, formed in three dimensions from one or more materials (e.g solid or liquid materials). The construction of the mold is computer-controlled according to given dimensions and shapes (CAD models). The manufacturing process (3D printing process) usually takes place in layers, with the material being applied layer by layer. Volumetric additive manufacturing processes are also possible. Additive manufacturing makes it possible to manufacture highly complex molds that can be extremely light and stable at the same time. Furthermore, a complex manufacture of expensive mold tools for the desired products is not necessary. Further advantages of the additive manufacturing process are e.g. high flexibility, fast manufacturing cycle, low energy and/or material consumption, easy handling, and low costs.

There are a number of different additive manufacturing processes. Exemplary additive manufacturing processes are selective laser melting, direct metal laser sintering, stereolithography, enamel deposition modeling, laminated object fabrication, and electron beam melting. However, these printing methods have several disadvantages and limitations. For example, there is a relationship between printing speed, the mechanical properties of the printed parts, and cost.

Recently, nano/short/continuous fibers and other reinforcing materials have been added to the polymer matrix in order to improve the mechanical properties of 3D printed parts. For example, a machine for producing three-dimensionally linked composite components has been proposed, with the linked composite components having warp threads running parallel to one another (cf. US 2018/0038045 A1).

Furthermore, a printing system for producing molds from a matrix material with oriented reinforcing fibers has been proposed (cf. US 2018/0036946 A1). A 3D printing machine for generating a first print path for the matrix material and a second path for the fiber material has been described in US 2018/0022032 A1.

The aforementioned printing processes can produce fiber-reinforced composite parts, but attempts to improve the print size, printing speed, fiber volume content, and bond strength of the products of additive manufacturing processes have had limited success only. For example, a variety of molds can be produced with the well-known 3D printing processes, but the print size is usually limited by the size of the filament. If large fiber-reinforced composite parts are required, the conventional thermal heating nozzle cannot meet these requirements. The heat transfer from a resistance-heated metal part to the material of the filament takes a long time. In order to melt the material in the core of a large-diameter filament, a high heating temperature is used. However, it can happen that the outer material disintegrates while the core of the material still has a very low temperature and does not melt. In addition, the printing speed cannot be increased due to the time-consuming heat transfer process. The known methods also do not provide a solution for increasing the fiber volume content and the bond strength of large-diameter filaments.

More recently, microwave technology has been considered an alternative to conventional heating of the materials. The advantages of heating using microwave radiation compared to conventional heating include: (i) volumetric and selective heating, (ii) fast heating rates, (iii) fast starting and stopping, (iv) shorter curing time, (v) saving of energy, (vi) higher levels of security and automation, and (vii) environmental friendliness. During the microwave heating process, energy is provided directly in the material by an electromagnetic field. This leads to rapid heating over the entire material thickness with an even temperature distribution, reduced energy consumption, and reduced costs. A well-known microwave 3D printing process uses a large chamber covering the 3D printer (cf. US 2015/0054204 A1). As an alternative to this known method, induction heating instead of microwave radiation is used in a further method for processing a metal material (cf. US 2018/0021877 A1).

The document US 2015/0054204 A1 describes a device in which the additive manufacturing system is present in a microwave chamber. Therefore, metal objects cannot be used in this chamber unless they are covered by a shield. In this system, the filament is heated in a tube before it reaches the print nozzle. Another problem is the uneven microwave field distribution in the chamber. Metal parts or edges lead to the focusing of the electric field and thus consume microwave energy. This can mean that the material to be printed cannot be melted. Another problem is that the temperature of the filament cannot be controlled.

The document US 2018/0021877 A1 describes a device with wound, spiral-shaped metal wires arranged around the print nozzle in order to generate a low-frequency electromagnetic field and to heat the material. The device is freely open and does not have any shielding device to prevent the escape of microwaves.

The document WO 2012/127456 A1 describes a device for the additive production of molds comprising an open near-field microwave applicator with an integrated material guide. The microwave radiation is localized in a small area at the tip of the microwave applicator. This induces a thermal runaway with plasma generation, which rapidly heats the material at the tip of the microwave applicator. A disadvantage of this device is that microwave radiation, which can be harmful to humans, escapes from the open microwave applicator into the environment. The escaping microwave radiation can be very strong in particular with low-loss materials (such as polymers), and exceed the permissible limits.

Thus, these known devices and methods from the prior art do not meet the requirements for the commercial-scale use of fiber-reinforced composite materials in 3D printing, the aim being in particular to improve the printing speed, the fiber volume content, and the mechanical strength.

It is therefore the object of the present invention to provide a method that enables the use of a fiber composite material in 3D printing while improving the printing speed, the fiber volume content, and the mechanical strength, and a device that can be used in such an advantageous method.

This object is achieved by the embodiments characterized in the claims.

A first aspect relates to a microwave printing device. The microwave printing device includes:
- an inlet (filament inlet) for a filament,
- an outlet (filament outlet) for the filament,
- a microwave heating device for heating the filament by means of microwave radiation,
- wherein the microwave heating device comprises at least one resonator, in particular a coaxial resonator;
- wherein the resonator forms a cavity (resonance cavity or resonance chamber) surrounded by electrically conductive material, and comprises a microwave radiation input for coupling in microwave radiation. Put differently, the resonator can be a cavity resonator, with the cavity or the resonance chamber being filled with a dielectric material (such as air). The electrically conductive material surrounding or forming the cavity is referred to as an outer conductor in the context of the application.

The resonator is a coaxial resonator formed by an outer conductor, which forms a cavity or a resonance chamber, and a coaxial inner conductor, and comprising a microwave radiation input for coupling in microwave radiation. The coaxial inner conductor is located within the cavity formed by the outer conductor or within the resonance chamber formed by the outer conductor and is parallel to at least one axis of the outer conductor forming the cavity, in particular parallel to a longitudinal axis. Preferably, the outer conductor or cavity and the inner conductor have a common axis. The coaxial inner conductor can extend over the entire length of the coaxial resonator or over only part of the total length of the coaxial resonator.

The inner conductor can be electrically connected to the outer conductor. For example, one end or both ends of the inner conductor can be electrically connected to the outer conductor. The inner conductor can e.g. be electrically connected to an end wall or end face or to the two end walls or end faces of the outer conductor forming the cavity.

The term "microwave printing device" is understood to mean a device for the additive manufacture of (three-dimensional) molds or objects using microwave radiation or a component thereof (such as the print head).

The term "filament" is understood to mean a material in the form of a continuous wire or thread that can serve as the starting material for a printing process. The material of the filament is not particularly limited as long as it can be heated by microwave radiation or has sufficient microwave absorption. The filament can be electrically conductive or electrically non-conductive.

The filament can e.g. be formed from a fiber composite material comprising at least one fiber and matrix material.

The fiber or fibers of the fiber composite material can be e.g. at least one type of fiber made of carbon fibers, metal fibers, glass fibers, graphite fibers, plastic fibers, ceramic fibers, boron fibers, steel fibers, and stone fibers. Examples of carbon fibers are 1K, 3K, 6K, 12K or 24K carbon fibers. Here, "1K" means that 1000 individual fibers are combined into one yarn. The other designations are corresponding multiples. 1K carbon fibers are preferably used. Examples of metal fibers are gold fibers, silver fibers, iron fibers, tungsten fibers, aluminum fibers, copper fibers, lead fibers, and fibers made of an alloy composed of metals of the aforementioned fibers. Examples of plastic fibers are aramid fibers such as Kevlar fibers and polyethylene fibers. Examples of ceramic fibers are alumina fibers, mullite fibers, SiBCN fibers, SiCN fibers, and SiC fibers. Examples of stone fibers are basalt fibers.

In a preferred embodiment, the fibers are at least one type of fibers made of carbon fibers, graphite fibers, glass fibers, copper fibers, silicon carbide fibers and/or aramid fibers (such as Kevlar fibers). A mixture of different fibers is also possible.

The matrix material of the fiber composite material can be a plastic or resin, e.g. a thermoplastic and/or a thermoset. Examples of thermoplastics are polyetheretherketone (PEEK), polyphenylene sulfide (PPS), polysulfone (PSU), polyetherimide (PEI), and polytetrafluoroethene (PTFE). Examples of thermosets are epoxy resin (EP), unsaturated polyester resin (UP), vinyl ester resin (VE), phenol-formaldehyde resin (PF), diallyl phthalate resin (DAP), methacrylate resin (MMA), polyurethane (FUR), and amino resins such as melamine resin (MF/MP) and urea resin (UF). The matrix material can also be a composite material, such as a mixture of plastic or resin with carbon powder, silicon carbide, ceramic, metal, graphene, and/or carbon nanotubes (CNT).

In a preferred embodiment, the fiber composite material is a carbon fiber-reinforced plastic, a glass fiber-reinforced plastic, a copper fiber-reinforced plastic or an aramid-reinforced (e.g. Kevlar reinforced) plastic.

The length of the fibers of the fiber composite material is not particularly limited. The fibers can e.g. be nanofibers, short fibers or continuous fibers. According to a preferred embodiment, the fibers of the fiber composite material are continuous fibers. The use of continuous fibers makes it usually unnecessary to use wheels and/or motors and/or other devices for pulling the filament during printing. As soon as the fibers of the fiber composite material contact the print platform and harden, these fibers can provide the force to pull the filament (e.g. from the print nozzle of an extrusion element).

In a preferred embodiment, the fiber composite material 1K comprises carbon fibers and PEEK as matrix material.

The filament extends from the inlet to the outlet of the microwave printing device and is continuously moved or conveyed through the microwave printing device. During this passage, the filament is heated in the microwave heating device with the resonator. The resonator is a coaxial resonator. The filament can be arranged centrally in the resonator and extend along a longitudinal axis or axis of symmetry of the resonator or the microwave heating device. The diameter of the filament can e.g. be between 0.01 mm and 100 mm, for example between 0.05 and 50 mm or between 0.1 and 10 mm.

In order to allow the passage of the filament, the resonator also has an inlet and an outlet for the filament (e.g. in the form of two openings in the outer conductor), with the filament extending from the inlet to the outlet. Heating of the filament takes place during the preferably continuous movement of the filament through the resonator.

The resonator comprises at least one outer conductor that forms a cavity (resonance cavity or resonance chamber). Furthermore, the resonator comprises at least one inner conductor that is arranged within the outer conductor or the cavity. Preferably, the inner conductor is arranged coaxially to the outer conductor or to the cavity. The outer conductor or cavity and the inner conductor thus have a common axis.

The use of the resonator provides resonant microwave radiation that enables particularly advantageous heating of the filament. In particular, by a suitable dimension of the resonator, a distribution of the standing waves of the microwave radiation formed in the resonator can be realized, which enables a particularly advantageous, preferably uniform, heating of the filament. Furthermore, the escape of potentially harmful microwave radiation from the resonator is relatively small, which improves the safety of the microwave printing device and maximizes the absorption of the microwave radiation by the filament. The microwave printing device can thus be made small and compact. Further advantages are a high printing speed and high mechanical stability of the printed product. Furthermore, it is possible to print large print areas quickly and efficiently. In one example, the filament can only be heated in the resonator, which contributes to a small and compact structure.

Furthermore, coaxial resonators can only be excited by TEM modes of electromagnetic radiation and have a significantly higher bandwidth than other waveguides (cf. e.g. Lo, Y. T., Lee, S W (2013) "Antenna Handbook: theory, applications, and design", published by Springer Science & Business Media, pages 28-5 and 21-57). The electric field in a coaxial resonator is polarized in the direction perpendicular to the inner conductor, has a maximum on the inner conductor and decreases proportionally to 1/r in the radial direction. This ensures a maximum and very effective absorption of the microwave energy on the inner conductor and thus in the filament. Furthermore, a uniform heating of the filament can be achieved.

The inner conductor can e.g. be made of a metallic material (such as brass) or another electrically conductive material. For example, the inner conductor can be in the form of a tube through which the filament extends.

Preferably, the filament itself is electrically conductive and forms the inner conductor or part of the inner conductor of the resonator. If the filament is formed from a fiber composite material, the fiber or the fibers, the matrix material or both can be electrically conductive.

Due to the use of an electrically conductive filament as the inner conductor or as part of the inner conductor of the coaxial resonator, the direction of the electric field in the resonator is perpendicular to the axial direction of the filament, whereby the microwave radiation penetrates into the material and can heat it over the entire volume cross-section, i.e. inside and outside. Depending on the microwave properties, a uniform temperature distribution can be achieved even with large-diameter filaments and with processes with a high printing speed. These advantageous effects can even be achieved with a filament that comprises a fiber composite material with a very high fiber content or fiber volume content. Due to the uniform temperature distribution, the bond strength between fibers and matrix material can be improved, so that pre-impregnation is made possible already before extrusion or pultrusion, which ultimately leads to a high mechanical strength of the printed parts. In addition, the use of molds by which the structure of the part to be printed is defined is advantageously not required.

The shape of the resonator is not particularly limited. The shape of the resonator is preferably calculated and/or optimized to achieve a predetermined or desired distribution of the standing waves or a predetermined mode distribution. The length of the resonator is ideally a resonant length and can e.g. be at least a quarter of the wavelength $\lambda$ of the microwave radiation or an odd multiple of a quarter of the wavelength $\lambda/4$ or a multiple of half the wavelength $\lambda/2$.

If the filament is based on an electrically conductive material (such as a filament of continuous carbon fiber in a dielectric matrix or any fiber in an electrically conductive matrix) and forms the inner conductor of the coaxial resonator, the length of the resonator is preferably at least $\lambda/2$ or a multiple of $\lambda/2$.

In the case of an inner conductor (e.g. in the form of a tube made of an electrically conductive material), which is electrically connected to the outer conductor at one end thereof and does not extend over the entire length of the outer conductor forming the cavity, and a non-electrically conductive filament with a sufficient dielectric absorption, the length of the coaxial resonator is preferably at least $\lambda/4$ or an odd multiple of $\lambda/4$.

The diameter of the resonator is not particularly limited and can be selected depending on the diameter of the filament, for example. The resonator or the outer conductor can e.g. be cylindrical and have a length of at least $\lambda/4$. The length of the at least one resonator can be variable or adjustable. In this way, for example, a particularly advantageous distribution of the microwave radiation (resonance radiation) can be realized in the resonator. As stated above, the length of the resonator is ideally a resonant length, i.e. an odd multiple of a quarter of the wavelength $\lambda/4$ or a multiple of half the wavelength $\lambda/2$.

The "microwave printing device" can be a "microwave extrusion device", i.e. an apparatus for additively manufacturing molds that, using microwave radiation, heats at least one filament and extrudes it through an extrusion element to form the mold. It is also possible (especially with an endless filament) to pultrude the filament.

In particular, the microwave printing device can comprise an extrusion element or a pultrusion element with a print nozzle for extruding or pultruding the heated filament. The term "extrusion" is in particular understood to mean a process in which a starting material is pressed through a mold, wherein a material of a defined shape with e.g. a smaller and/or different cross-sectional area than the starting material is obtained through the pressing. A pultrusion process or extrusion process is a continuous process in which the starting material is continuously pulled through a tool (e.g. a print nozzle). The "microwave printing device" can accordingly be a "microwave pultrusion device".

The print nozzle can be configured to change the cross section (e.g. the shape and/or the diameter) of the filament.

The cross section of the extruded or pultruded filament extruded or pultruded from the print nozzle can have at least one of shapes selected from an ellipse, a rectangular shape, a circular shape, a hollow ellipse, a hollow rectangular shape, a hollow circular shape, an L-shape, a U-shape, an I-profile shape, a lattice girder shape, and a combination of the aforementioned shapes. In one example, at least one surface of the extruded or pultruded filament exiting from the print nozzle can be planar or laminar.

As a result, the filament can be brought into contact with a print platform particularly easily, whereby the quality and/or the speed of the printing process can be increased.

The extrusion element or pultrusion element and in particular the print nozzle is or are arranged at the filament outlet or in the vicinity thereof. The extrusion element or pultrusion element and in particular the print nozzle can be connected to the filament outlet directly or indirectly (i.e. by means of further connecting elements).

The extrusion element or pultrusion element and in particular the print nozzle can be at least partially permeable or transparent to microwave radiation. The filament can thus be heated further in the extrusion element or pultrusion element or in the print nozzle, e.g. to accelerate the printing process. It is also possible to use the microwave radiation present in the extrusion element or pultrusion element or in the print nozzle to support or carry out a cutting process of the extruded filament.

Furthermore, the extrusion element or pultrusion element or the print nozzle can comprise a cutting device for cutting through the extruded filament. The cutting device can e.g. consist of at least one blade or comprise at least one blade. The blade can e.g. be arranged around the outlet of the print nozzle and be connected to the print nozzle. The cutting device can also be a device separate from the extrusion element or pultrusion element or the print nozzle.

Subsequent to the extrusion or pultrusion, the filament can be deposited on a platform. Here, the position of the extrusion element or pultrusion element or the print nozzle relative to the platform can be specified by a print path. A cooling device for more rapid cooling of the extruded or pultruded filament can be provided.

If the filament is electrically conductive, the microwave printing device can further comprise at least two microwave filters for reducing or preventing the microwave radiation escaping from the resonator (i.e. for shielding the resonator), with each of the microwave filters having a passage (for example in the form of an opening) for the filament. In the case of a non-electrically conductive filament, depending on the diameter of the filament and its microwave properties, it is generally not necessary to shield the resonator with microwave filters.

The microwave filters used are not particularly limited as long as they can at least partially shield microwave radiation. The microwave filters can e.g. be filled with a preferably low-loss dielectric such as ceramic, glass, polytetrafluoroethylene (PTFE), air or another suitable material.

At least one microwave filter can be arranged at or near the filament inlet. The microwave filter can be connected indirectly (by means of suitable connecting elements) or directly (immediately) to the filament inlet. At least one other microwave filter can be arranged at or near the filament outlet. The microwave filter can be connected indirectly (by means of suitable connecting elements) or directly (immediately) to the filament outlet. It is possible to use a combination of two or more microwave filters in each case in order to achieve improved shielding of the resonator. This can improve the safety of the printing process and also maximize the absorption of the microwave radiation by the filament. Furthermore, the size of the microwave printing apparatus as a whole can be reduced, since a chamber shielding the entire microwave printing apparatus is not necessary.

In one example, at least two microwave filters are used, at least one microwave filter being arranged between the inlet for the filament of the microwave printing device and the resonator and at least one microwave filter being arranged between the resonator and the extrusion element or pultrusion element or the print nozzle. There are openings in the at least two microwave filters through which the filament can be passed.

In another example, at least four microwave filters are used, at least two microwave filters being arranged between the inlet for the filament of the microwave printing device and the resonator and at least two microwave filters being arranged between the resonator and the extrusion element or pultrusion element or the print nozzle.

In a further example, at least six microwave filters are used, at least three microwave filters being arranged between the inlet for the filament of the microwave printing device and the resonator and at least three microwave filters being arranged between the resonator and the extrusion element or pultrusion element or the print nozzle.

The microwave printing device can comprise several regions with different temperatures and/or a plurality of resonators (e.g. a plurality of coaxial resonators). Different temperatures can be realized in the different resonators, for example.

For example, the microwave printing device can comprise a first resonator, a second resonator, and a third resonator, each resonator comprising an outer conductor and an inner conductor. The outer conductor of each of the resonators forms a cavity in which the inner conductor is arranged (preferably coaxially). The microwave printing device can also comprise only two resonators, for example a first and a second or a first and a third resonator. The resonators are coaxial resonators.

The first resonator can be connected to the second resonator, the longitudinal axis of the first resonator and the longitudinal axis of the second resonator being parallel and forming a common longitudinal axis. The connection can be made by means of suitable connecting elements. The connection can e.g. be a fixed connection. The third resonator can be formed concentrically within the first resonator and have a common longitudinal axis with the first resonator. In one example, the inner conductor of the first resonator can form the outer conductor of the third resonator.

The first resonator can e.g. primarily serve to couple and distribute the microwave energy between the second and the third resonator. As described above, the temperatures that can be achieved in the second and third resonators can be different. For example, the achievable temperature in the third resonator can be higher than the achievable temperature in the second resonator and/or in the first resonator. The printing temperature is preferably reached in the third or in the last resonator.

Other arrangements (such as comprising more or less than three resonators) are also possible.

The difference in temperatures in the different temperature zones (e.g. in the different resonators) can depend on the material of the filament to be heated. For polymer matrix materials, the difference in temperatures in the different temperature zones can be between 100° C. and 400° C., for example.

The filament inlet and the filament outlet of the microwave printing device are not particularly limited. In one example, the inlet for the filament can comprise at least one inlet for at least one fiber and one inlet for a matrix material of a fiber composite. In particular, the filament inlet can comprise an element with openings for the fibers and a further element for the matrix material of the fiber composite. Furthermore, the filament inlet and/or the filament outlet can have connecting elements or connecting portions in order to connect the filament inlet and/or the filament outlet to other components (such as microwave filters, print nozzles, etc.).

The microwave printing device can further comprise a pultrusion device for shaping the filament. The pultrusion device can in particular be configured to bring the fibers and the matrix material together and to thus form a filament from a fiber composite material. The pultrusion device may have a configuration similar to the microwave printing device. In particular, the pultrusion device can comprise a microwave heating device with at least one resonator.

The pultrusion of the fibers and the matrix material of the fiber composite material is carried out before the filament is provided at the inlet of the microwave printing device. As a result, a filament with a high proportion of fibers and low porosity can be provided.

The pultrusion device does not necessarily have to be part of the microwave printing device, but can be a separate device.

The microwave printing device can further comprise at least one filament fixing device for fixing the filament in the resonator or at a specific position in the resonator. The filament fixing device can e.g. be configured and arranged to fix or firmly hold the filament in a central position (e.g. along the longitudinal axis) of the resonator. The filament fixing device can e.g. be configured as a closed or partially open tube. The filament fixing device is preferably formed at least partially from a material (e.g. quartz) that is transparent to the microwave radiation.

The microwave radiation can be coupled into the resonator inductively or capacitively. The microwave radiation used can e.g. have a frequency in a range from 300 MHz to 30 GHz. Preferably, the microwave radiation has a frequency in the range from 900 MHz to 6 GHz. The power of the microwave radiation used can be higher than 1 W, preferably higher than 20 W, The upper limit of the power of the microwave radiation used depends on various factors, such as the size and/or the material of the filament to be heated and/or the printing speed. Depending on the printing speed and/or the thickness of the filament to be printed and/or other printing parameters, the microwave radiation can be in the range from a few watts to several kW, independent of the frequency.

For example, microwave radiation with a maximum power of 200 W at a frequency of 2 GHz to 6 GHz can be used to heat a carbon fiber-reinforced filament with a diameter of 0.5 mm.

The microwave printing device can furthermore comprise at least one additional heating device for heating the filament and in particular the surface of the filament. The additional heating device preferably does not use microwave radiation for heating the filament, but is based on other principles. The at least one additional heating device can e.g. be an electrical heating device, in particular a resistance heating device. By using several, preferably different, heating devices, one can realized a hybrid microwave printing device that ensures optimal heating of the filament and in particular the surface of the filament. The additional heating device can be arranged before or after the microwave heating device (in the direction of movement of the filament). Preferably, the additional heating device is arranged after the microwave heating device. Preferably, the additional heating device is set up to heat the surface of the filament in the print nozzle at the output of the microwave printing device. As described above, the volume of the filament is heated in the microwave heating device. However, due to the cold environment, heat losses through the surface of the filament can occur. These heat losses can be compensated for in a controlled manner by the additional heating device.

According to a second aspect of the present invention, there is provided a system for the additive manufacture of molds (additive printing device). The system includes;
- a microwave printing device according to the first aspect,
- a print platform on which the filament is printed or deposited or applied by the microwave printing device along a print path;
- a moving device for moving the microwave printing device and in particular the microwave heating device and/or the print platform relative to one another; and
- a control or regulating device for controlling or regulating the printing process, such as the movement of the microwave printing device and/or the print platform relative to one another, for controlling and/or regulating the printing speed and/or the temperature and/or the pulling speed of the filament and/or the supply speed of the filament and/or a filament cutting device and/or other parameters of the printing process.

The system can further comprise a microwave energy source (microwave radiation source). The microwave energy source is not particularly limited. The microwave energy source can have an amplifier. The microwave energy can be transmitted to the microwave printing device via a coaxial cable or waveguide.

The connection between the microwave printing device and in particular the microwave heating device is not particularly restricted as long as a transmission of the microwave radiation to the microwave printing device is guaranteed. For example, the microwave heating element can be connected to a microwave energy source via a 50 Ohm adapter and a flexible high-performance cable. Preferably, a quarter wavelength resistor adapter is used in the microwave printing device to reduce reflection of the microwave radiation.

Furthermore, the system for the additive manufacture of molds can comprise a data processing device. The data processing device can comprise at least one of the following modules: CAD model generation module, stress distribution analysis module, print path generation module, print path simulation module, interference checking module, Gcode generation module, and printing process control module.

The configuration of the system for the additive manufacture of a mold is not particularly limited. According to one embodiment, the configuration is based on a machine with numerical control (CNC machine) with three axes. In one embodiment, the platform determines the position of the z-axis, while the microwave printing device determines the position of the x- and y-axes. According to an alternative embodiment, the microwave printing device determines the position of the z-axis, while the platform can move in the x- and y-directions and thus determines the corresponding position of the x- and y-axes. According to a further embodiment, a robotic arm or a five-axis CNC machine can be used as a configuration of the additive printing device.

In a preferred embodiment, the print platform can be heated in order to reduce deformation of the printed parts caused by uneven temperature distribution.

The system for the additive manufacture of a mold can comprise further elements and/or modules, such as motion actuators, a linear guide screw, motors, a sliding block, a fixing block, etc.

According to a third aspect, an additive method for manufacturing a mold using microwave radiation is proposed. The method comprises the steps of:
- providing a filament at an inlet of a microwave printing device, the microwave printing device comprising at least one coaxial resonator;
- heating the filament in the coaxial resonator using microwave radiation; and
- printing the heated filament to form the mold.

The microwave printing device can in particular be a microwave printing device according to the first aspect. The above statements in connection with the microwave printing device and the system for the additive manufacture therefore also apply to the method according to the third aspect.

As described above, the filament can in particular be a filament made of a fiber composite material comprising at least one fiber and a matrix material. For example, the at least one fiber of the fiber composite material can be a carbon fiber, graphite fiber, metal fiber, glass fiber, plastic fiber, ceramic fiber, boron fiber, steel fiber and/or stone fiber. The at least one fiber of the fiber composite material can be a continuous fiber. It is also possible to combine several types of fibers. The filament can be electrically conductive and used as the inner conductor of the resonator or as part of the inner conductor of the resonator.

The method may include printing by extruding or pultruding the filament and applying the extruded or pultruded filament to a printing plate. Further, pultrusion can be carried out before the filament is provided at the inlet of the microwave printing device.

Figure 2:
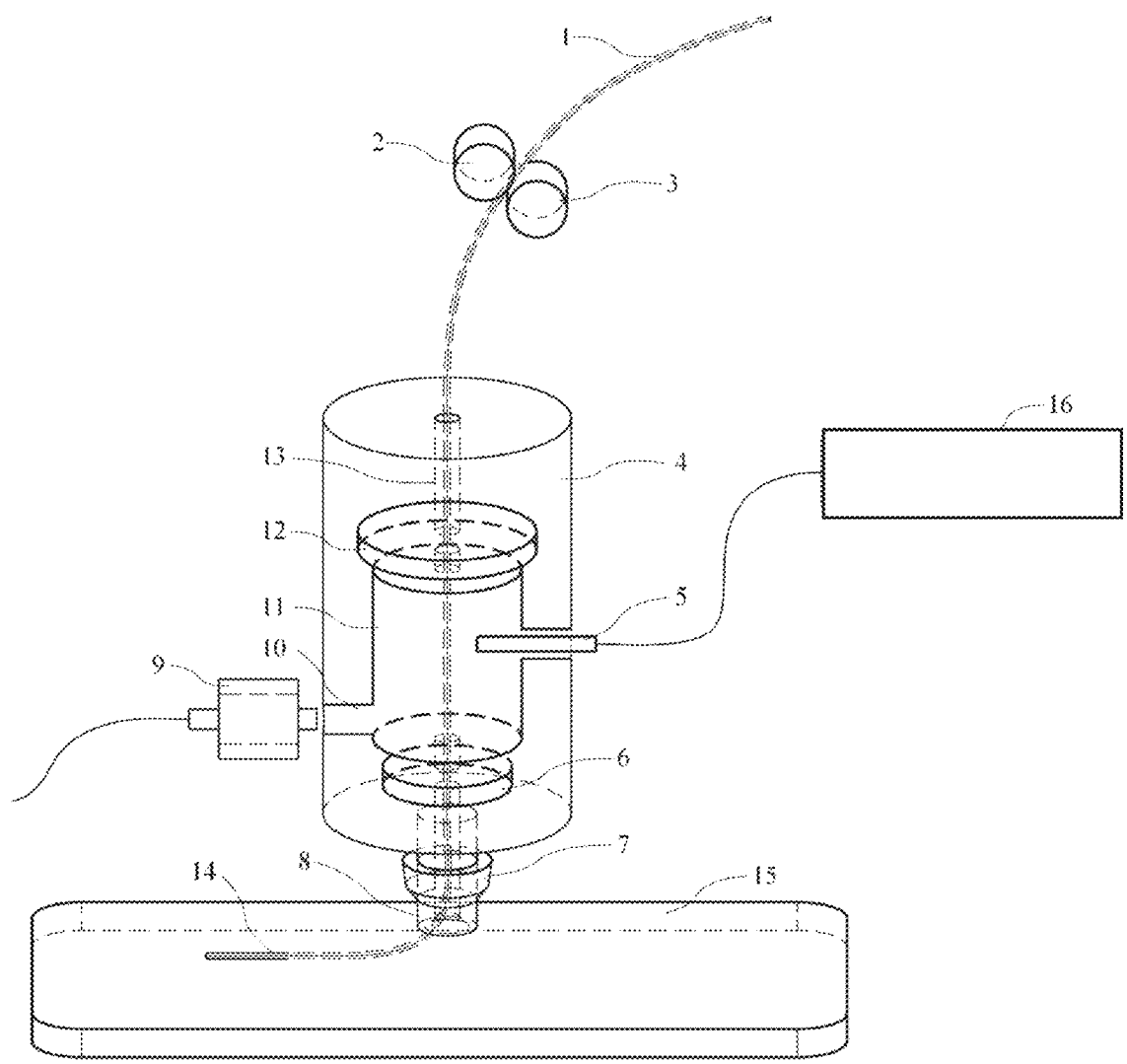
Figure 3:
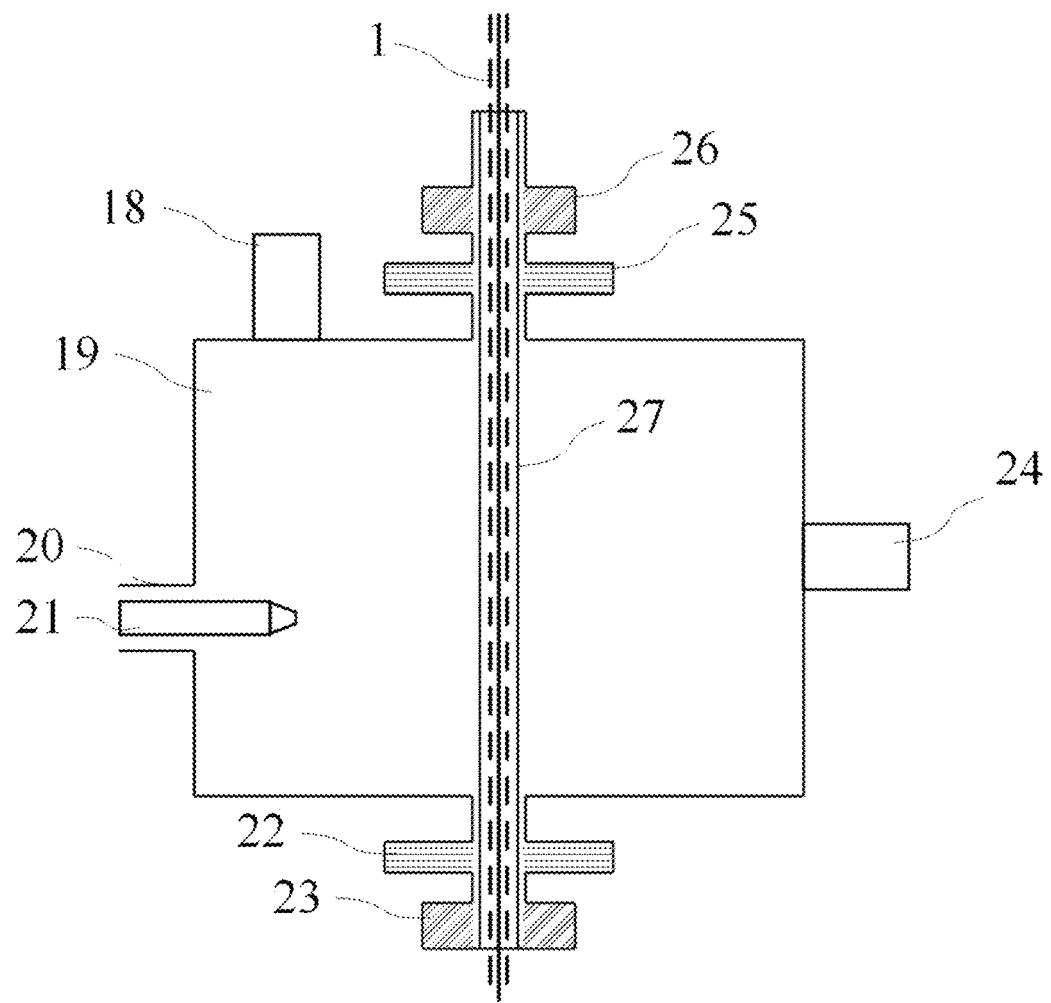
Figure 6:
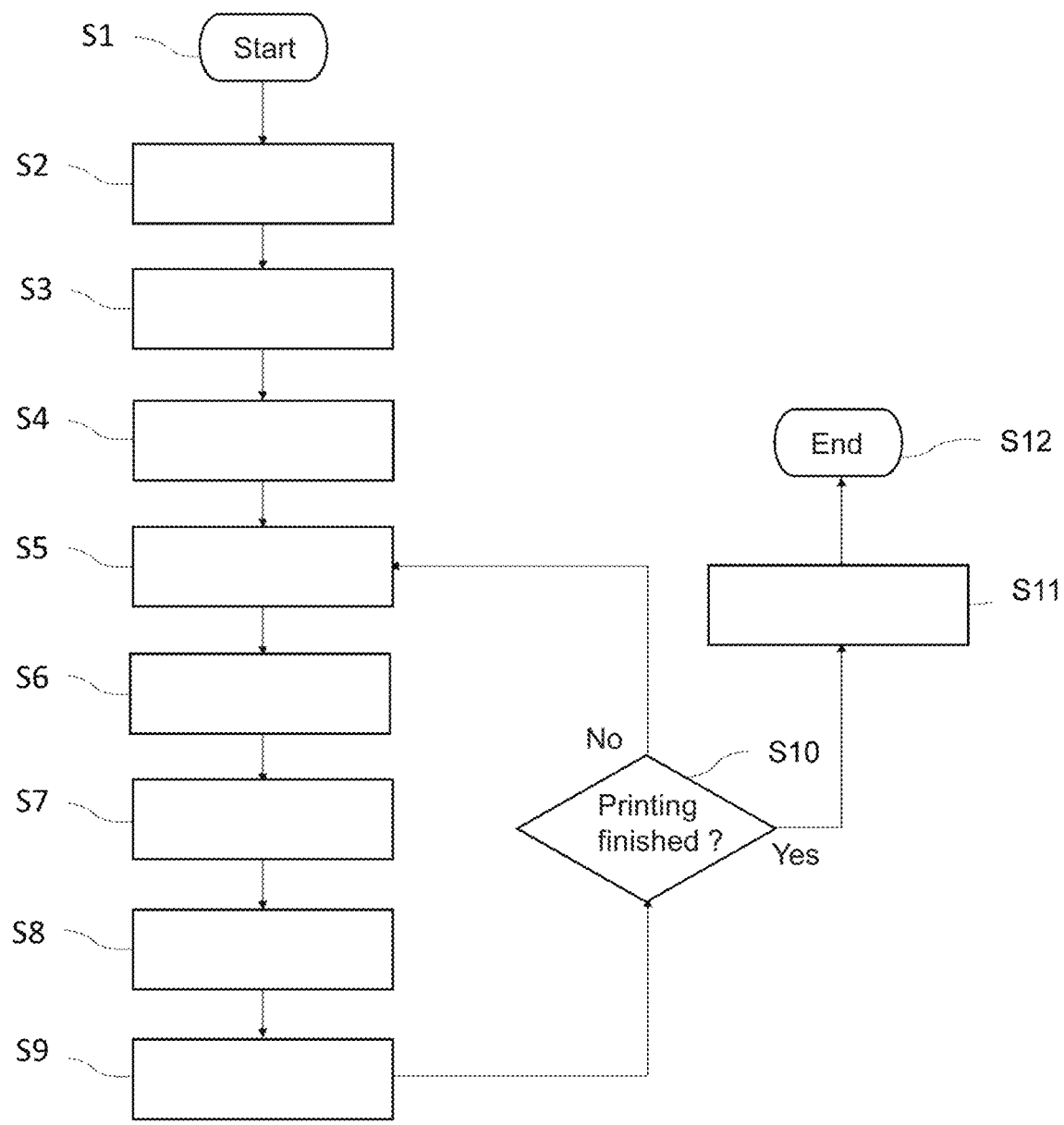
Figure 7:
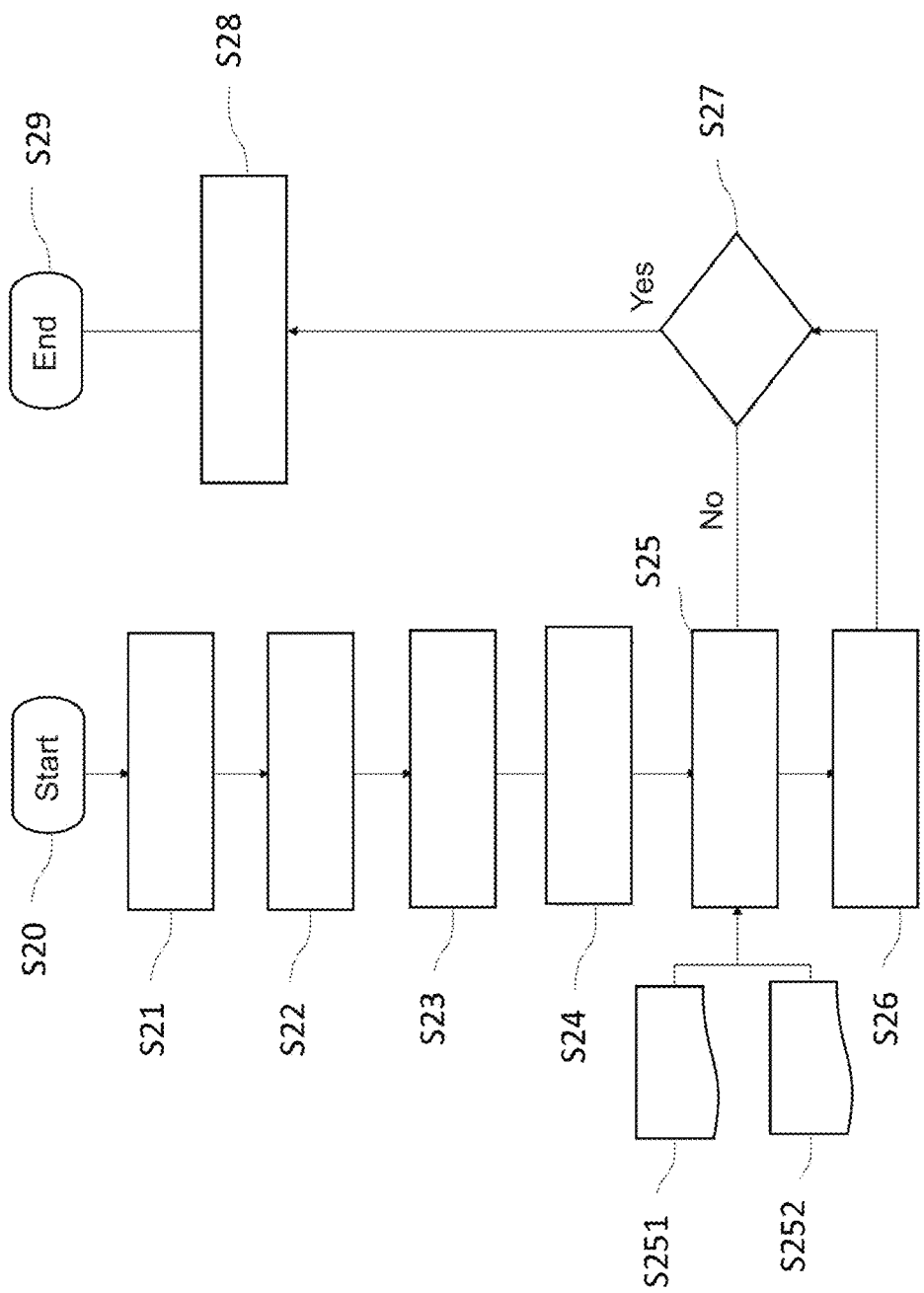
Figure 8:
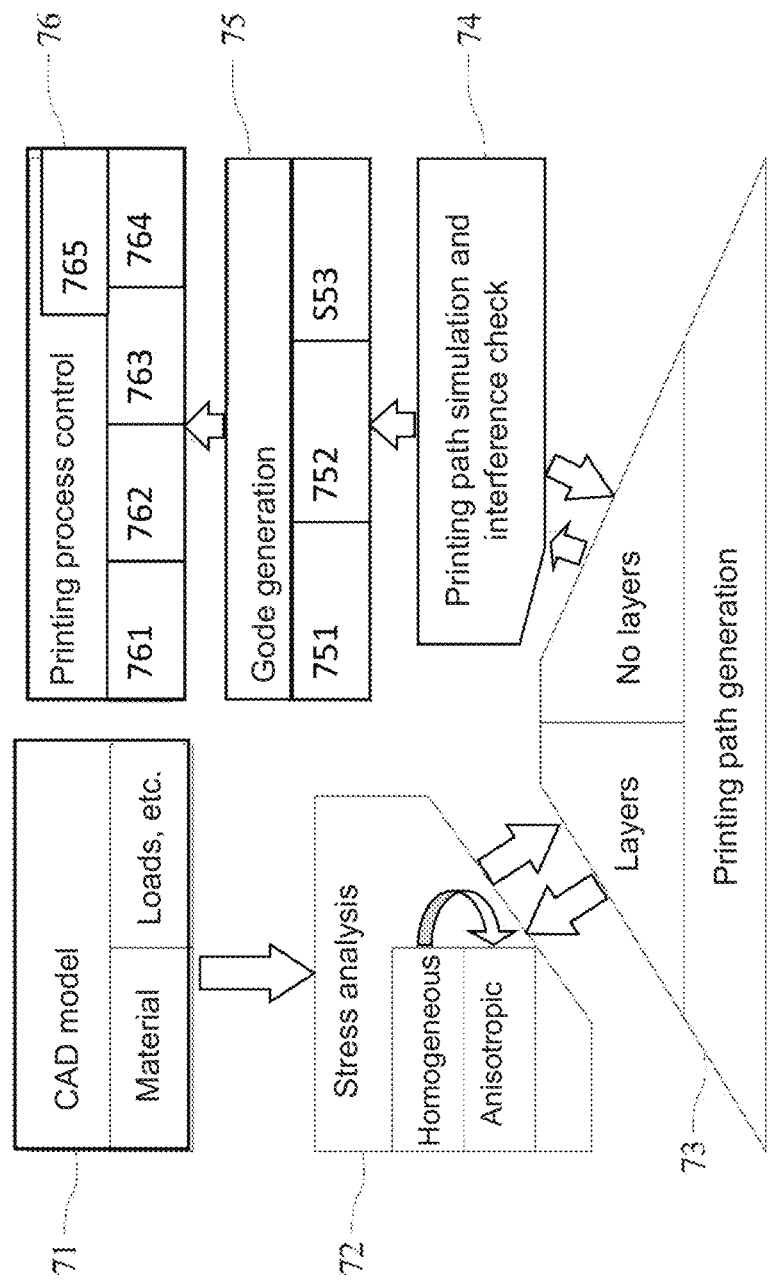
Figure 9A:
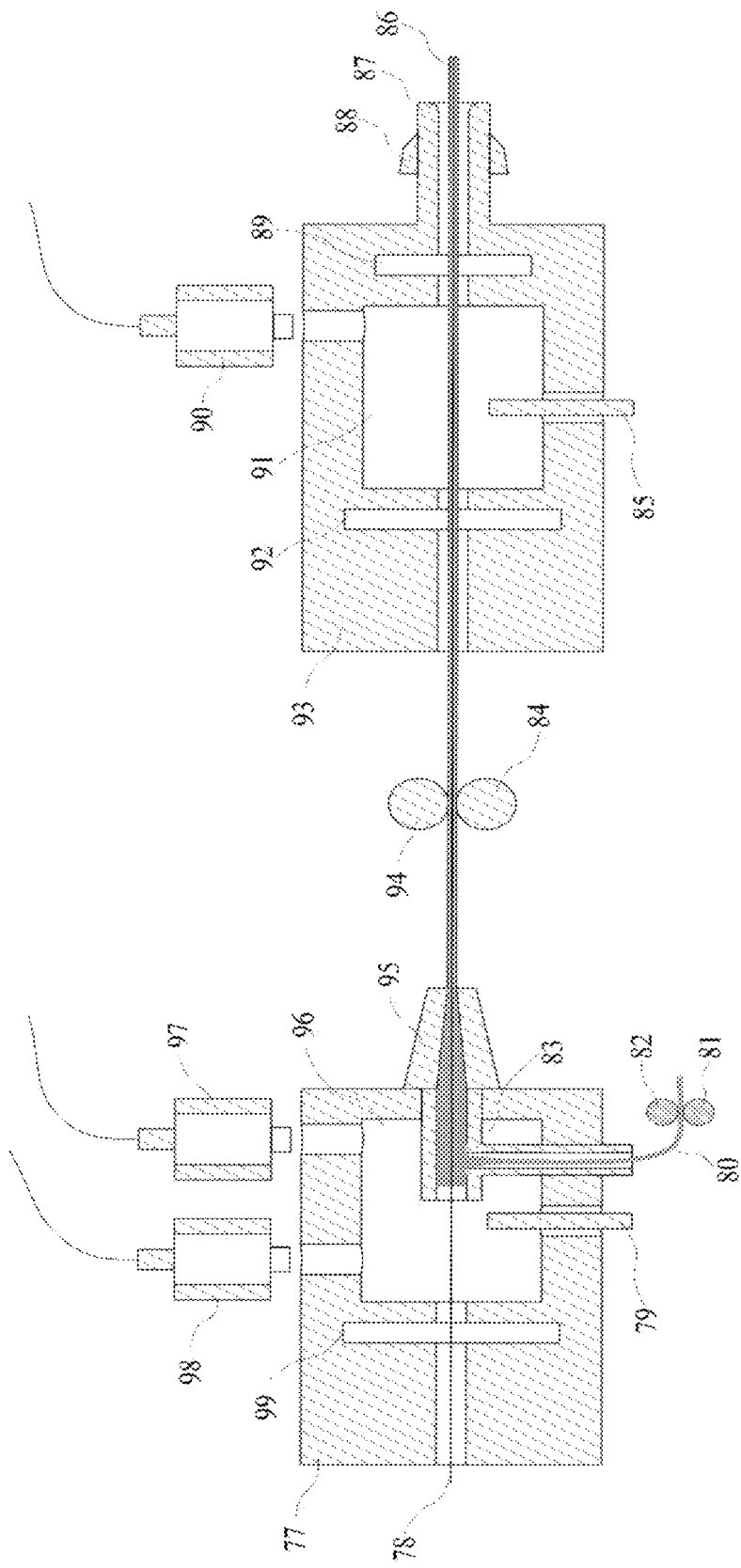
Figure 9B:
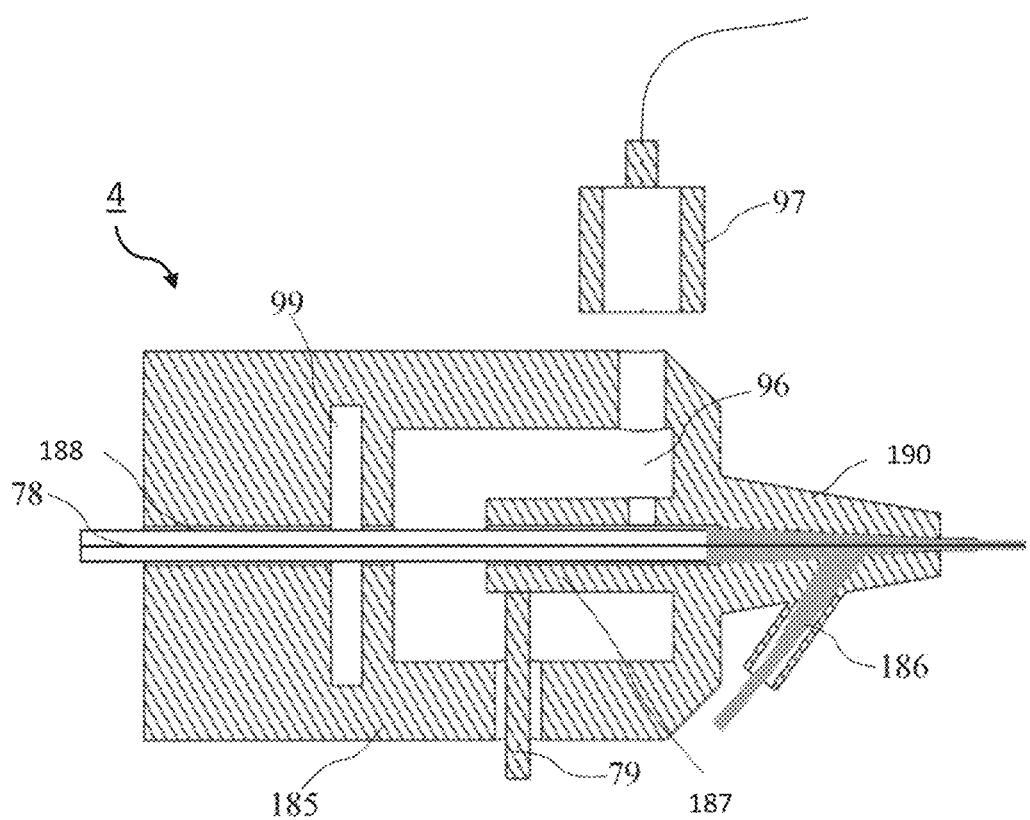
Figure 10:
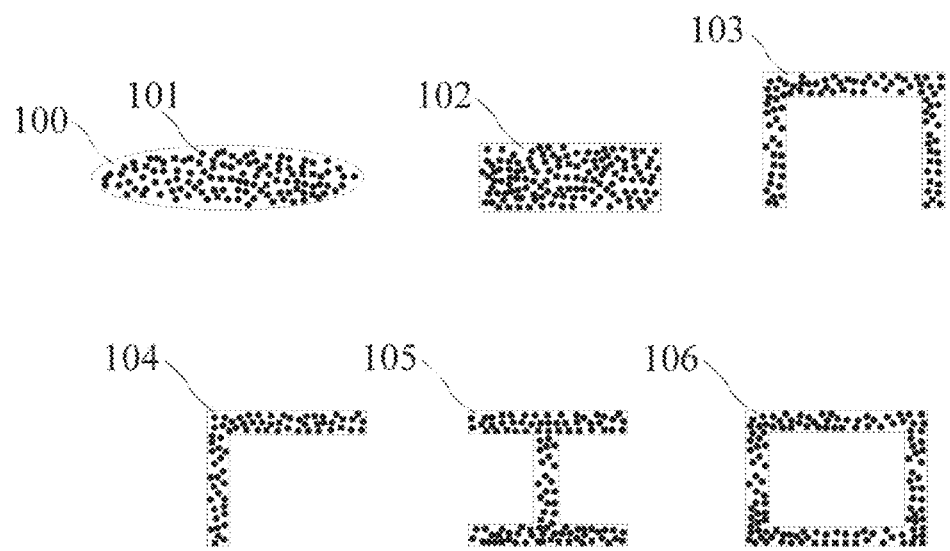
Figure 11:
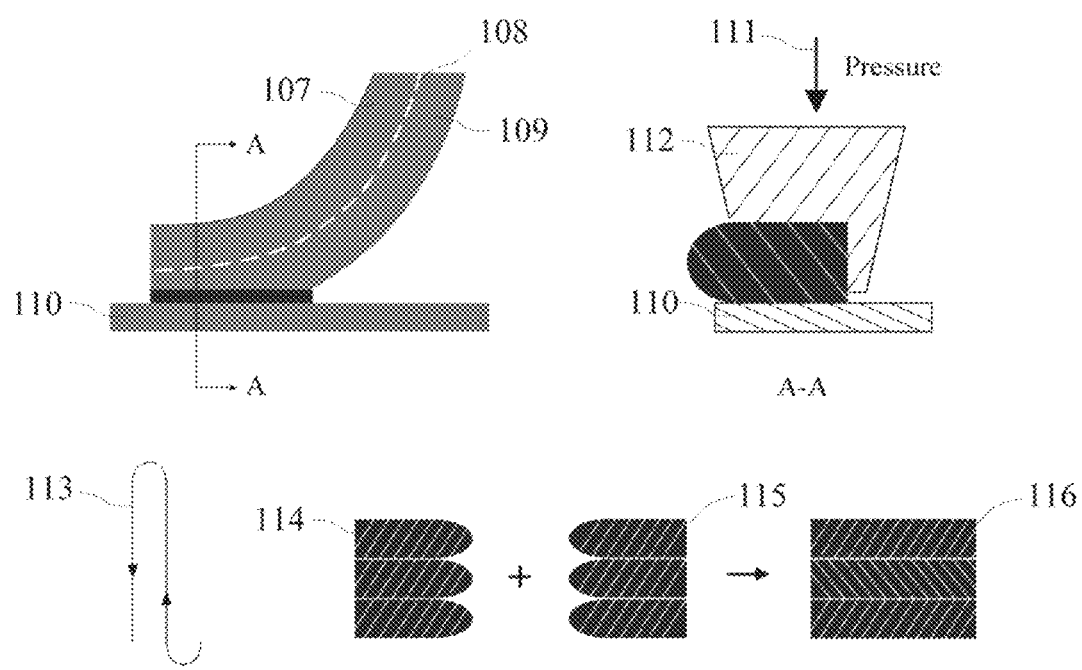
Figure 12:
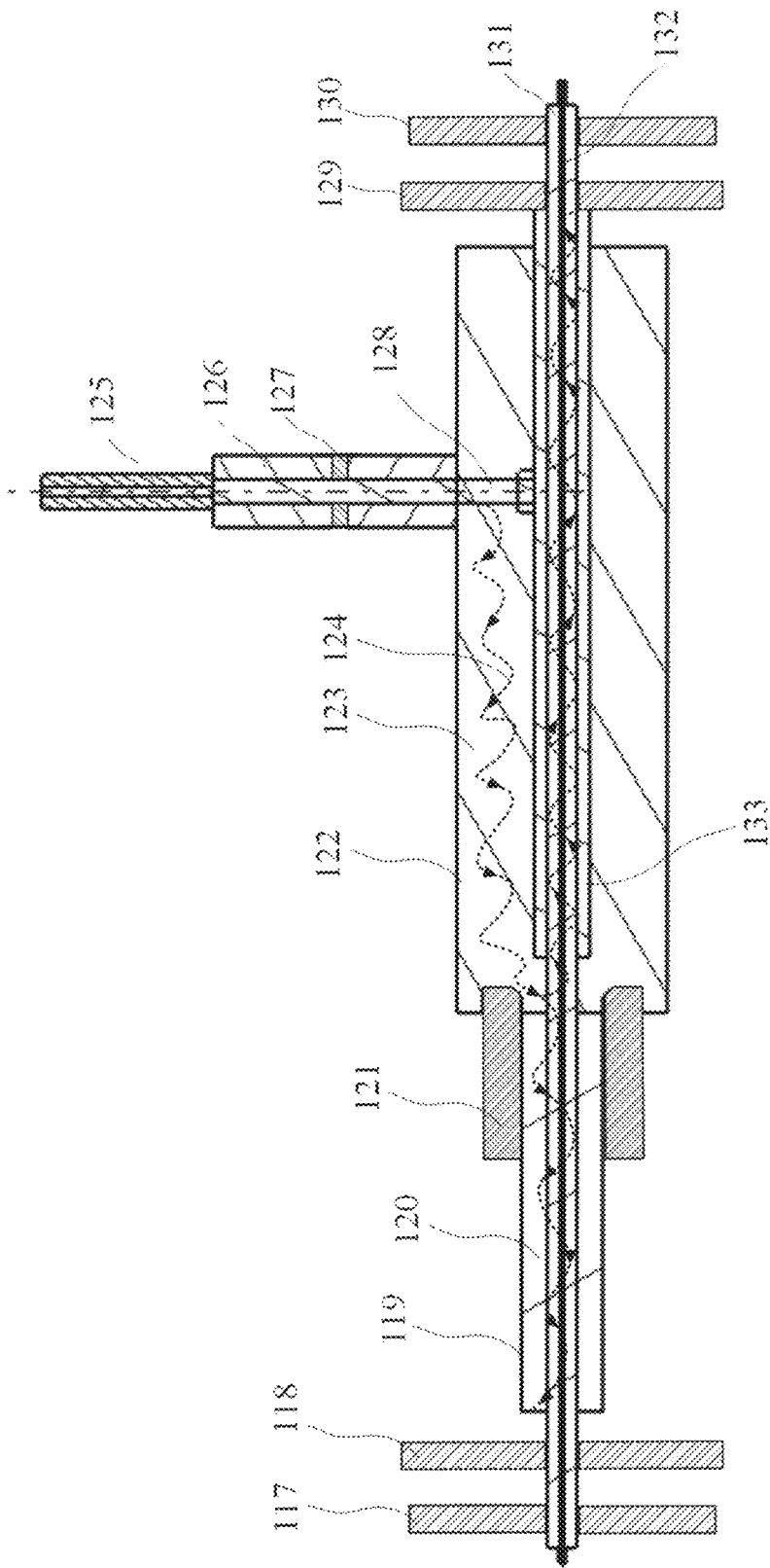
Figure 14:
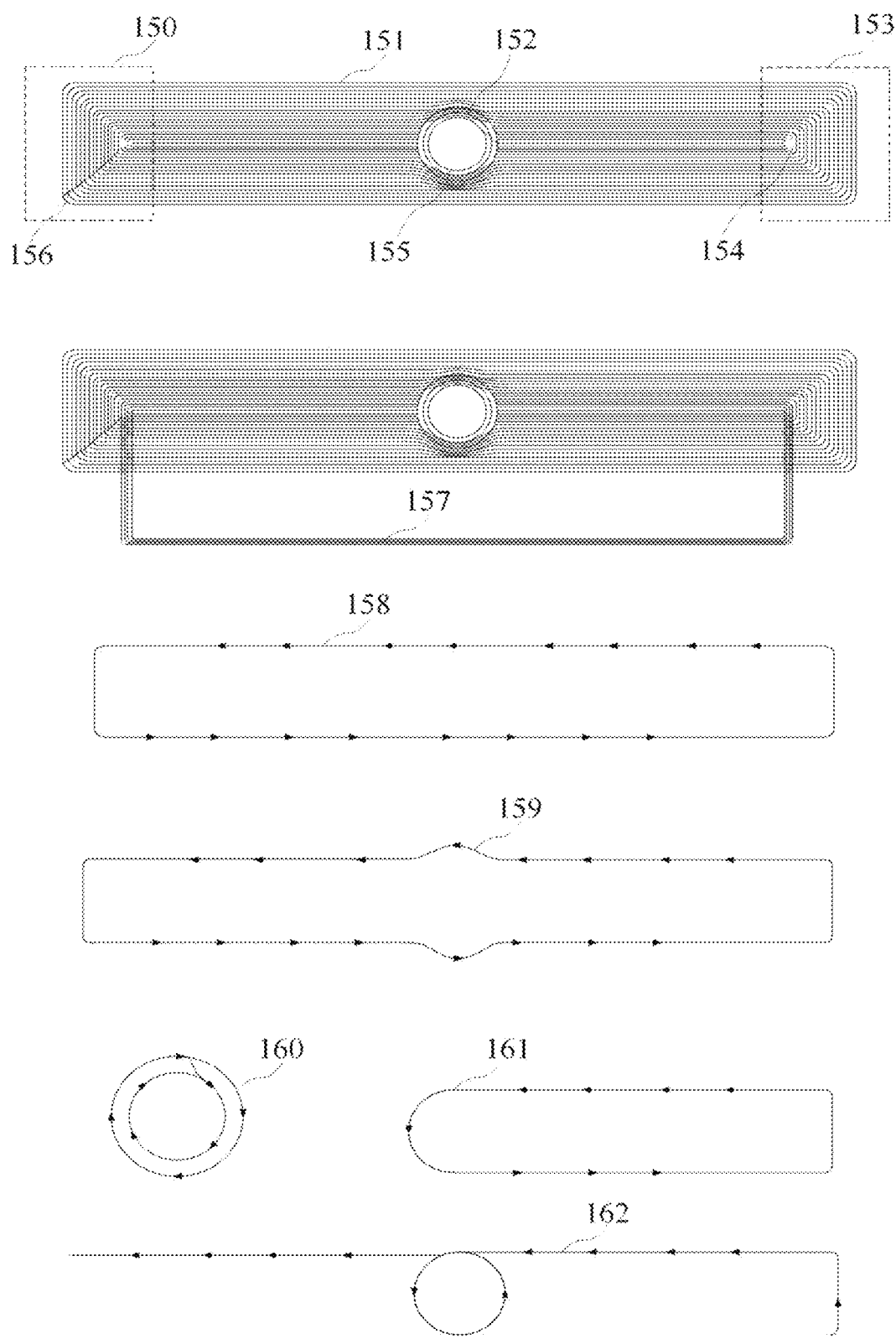

Embodiments of the present invention will be described below by way of example with reference to accompanying figures. Individual elements of the described embodiments are not limited to the respective embodiment. Instead, elements of the embodiments can be combined with one another as desired and new embodiments can be created thereby. The figures show:

FIG. 1: an exemplary system for the additive manufacture of molds;

FIG. 2: a schematic representation of a system for the additive manufacture of molds with an exemplary microwave printing device;

FIG. 3: a schematic representation of an exemplary microwave heating device;

FIG. 4: schematic representation of an exemplary print nozzle with a device for cutting the filament;

FIG. 5: a schematic representation of a print nozzle with a cooling device for cooling the extruded filament;

FIG. 6: is a flow chart illustrating an example of the additive manufacturing process;

FIG. 7: a flow chart illustrating an exemplary method for creating or generating a print path;

FIG. 8: an exemplary system for the additive manufacture of molds;

FIG. 9a: a schematic representation of an exemplary system for the additive manufacture of molds with an impregnating device upstream of the microwave printing device;

FIG. 9b: a schematic representation of an exemplary microwave heating device;

FIG. 10: exemplary cross sections of a printed filament;

FIG. 11; a schematic representation of exemplary print nozzles;

FIG. 12: a schematic representation of an exemplary microwave printing device with plural resonators;

FIG. 13: a schematic representation of a further exemplary microwave printing device;

FIG. 14: an exemplary print path fora rectangular mold with an opening in the middle;

FIG. 15: the outer form of n exemplary microwave printing device;

An exemplary system 200 for the additive manufacturing of molds using microwave energy is shown in FIG. 1. In the embodiment illustrated, the configuration is based on a three-axis machine. The system comprises a platform 300 (print platform) and a microwave printing device 210 that can be moved relative to the platform 300. In the example shown, the platform 300 determines the position of the z-axis, while the microwave printing device 210 specifies the position for the x- and y-axes. Other configurations are also possible. For example, the platform 300 can be moved along the x and y axes and the microwave printing device 210 can be moved along the z axis. It is also possible to use a robot arm or a 5-axis CNC machine.

Furthermore, the system comprises a linear guide screw 290, motors 280, a slide block 220, a fixing block 320, and a motion control device 330 comprising the motion actuators. The linear guide screw 290, the motors 280, the slide block 220, the fixing block 320 can be part of a movement device for moving the microwave heating device 210 and/or the print platform 300 relative to one another. The movement control device 330 can be part of a control or regulating device for controlling or regulating the printing process.

A microwave energy source with amplifier 230 transmits the microwave energy through a flexible cable 270 to the microwave printing device 210. The system further comprises a pultrusion device 240 in which the fibers and the matrix material for the fiber composite material of the filament are mixed, heated and pulled out by means of a device 250 to form the filament 260. Subsequently, the filament 260 is fed to the microwave printing device 210. For example, the device 250 can include a gearbox and a motor. The printing process is monitored and controlled or regulated with using a control device with a touchscreen 340.

FIG. 2 shows a system for the additive manufacture of molds. The system comprises a microwave printing device with a microwave heating device 4. The material to be heated is fed to a device for heating material by means of microwave radiation (microwave heating device) in the form of a continuous filament 1. As described above, the continuous filament 1 can consist of a fiber composite material. The fiber composite material can consist of fibers embedded in a matrix material (such as resin, plastic or polymer). The fiber composite material can e.g. be a continuous carbon fiber-reinforced plastic (CFRP). The filament 1 is continuously conveyed toward the microwave heating device 4 and a nozzle 8 (print nozzle) by means of a filament feed device. The print nozzle can be an extrusion nozzle or a pultrusion nozzle. The filament feed device can e.g. comprise two rotating rollers 2 and 3, which pull the filament 1 running between the rollers and convey it into the microwave heating device 4. The rotation speed of the rollers 2 and 3 substantially corresponds to the printing speed. The rotation speed of the rollers 2 and 3 can be adjustable in order to adapt them to different printing speeds.

The microwave heating device 4 is configured to convert microwave energy into thermal energy in order to heat the filament 1 as it passes through the microwave heating device 4. The microwave heating device 4 comprises a resonator with an outer conductor, which forms a substantially closed cavity 11 (microwave cavity) (cavity resonator). In the case of an electrically conductive filament, the resonator is a coaxial resonator. The outer conductor or cavity 11 has a cylindrical shape with a length of λ4 (e.g. 30.6 mm for f=2.45 GHz) to λ (e.g. 122.4 mm for f=2.45 GHz), where λ is the wavelength and f is the frequency of the microwave radiation. The diameter of the outer conductor or cavity 11 can be selected appropriately. For a filament with a diameter of approximately 8 mm, the diameter of the outer conductor or the cavity 11 can be between 15 mm and 50 mm, for example. The filament 1 is conveyed or moved through the resonator (preferably centrally). The filament 1 thus extends along the longitudinal axis or the axis of symmetry of the resonator.

The resonator or cavity 11 has an inlet for the filament (filament inlet) into which the continuous filament is introduced, and an outlet for the filament (filament outlet) from which the filament escapes. The filament inlet and the filament outlet can e.g. be formed as openings in the outer conductor forming the cavity 11. The openings can be formed e.g. in the two opposite side walls (end walls) of the cylindrical outer conductor. The diameter of the respective opening can be slightly larger than the diameter of the filament. For a filament with a diameter of approximately 8 mm, the diameter of the respective opening can e.g. be approximately 10 mm. The material of the filament 1 to be heated is preferably conductive and thus forms an inner conductor of the resonator.

The microwave energy generated by a microwave generator (not shown) is coupled into the resonator or into the cavity 11 by means of a microwave antenna 5. The microwave antenna 5 can e.g. be inserted into the cavity 11 through an opening provided for this purpose in the jacket surface of the cylindrical outer conductor. A control and/or regulating device 16 controls and/or regulates at least one parameter of the printing process, such as the microwave energy or radiation coupled into the cavity, the conveying speed of the filament, etc.

The microwave printing device 4 further comprises two microwave filters 6 and 12, which are configured and arranged to absorb microwave radiation exiting the resonator or the cavity 11. The microwave filters 6 and 12 can e.g. be λ/4 traps, with the filter effect being defined by the geometry of the electrically conductive wall. Preferably, the cavity is filled with ceramic or another suitable dielectric having a high dielectric constant. This reduces the size of the filters, since the wavelength λ in the dielectric is correspondingly small. In the example shown, a first microwave filter 12 is arranged at the filament inlet of the resonator or in the vicinity thereof. A second microwave filter 6 is arranged at the filament outlet of the resonator or in the vicinity thereof. The microwave filters 6 and 12 have corresponding openings through which the filament passes. The microwave filters can be connected directly or indirectly (i.e. by means of other elements) to the resonator.

The microwave printing device can further have a housing enclosing the cavity 11 and the microwave filters 6 and 12. The housing has a filament inlet and a filament outlet through which the continuous filament is continuously conveyed, and which are arranged in correspondence with the filament inlet and the filament outlet of the resonator or cavity 11. The filament inlet and the filament outlet can e.g. be formed as openings in the housing of the microwave heating device.

The filament outlet of the housing has a portion or a connection for connecting a print nozzle 8. The print nozzle 8 can be part of an extrusion element or a pultrusion element. The heated filament is extruded or pultruded by means of the print nozzle 8. The extruded or pultruded filament 14 can have an arbitrary cross-sectional shape predetermined by the print nozzle 8.

A small part of the microwave energy can enter the print nozzle 33 or be coupled into it. The microwave radiation or microwave energy entering or coupled into the print nozzle 33 can be adjusted with the microwave filter 6, If, for example, stronger microwave radiation or higher microwave energy is required (e.g. above 5 mW/cm$^2$), a microwave filter with a low-quality factor can be used. If the incoming microwave radiation or microwave energy is to be weak or low, a microwave filter with a higher quality factor can be used. The microwave filter 6 can be arranged between the filament outlet of the resonator or housing and the print nozzle 8.

The microwave printing device 4 can further have a cutting device 7 for cutting through the filament 1 (filament cutting device). The filament cutting device 7 can comprise at least one blade that can be formed integrally with the print nozzle 8. It is also possible to use a filament cutting device 7 separate from the print nozzle. The filament cutting device 7 is formed in the form of a blade that is arranged in a ring around the print nozzle 8.

The process of heating the filament 1 takes place in the cavity 11 of the resonator during the movement of the filament 1 through the resonator. The temperature of the heated filament 1 can be measured through an opening 10 provided for this purpose in the outer conductor or the cavity 11 by means of a non-contact temperature sensor 9. The signal detected by the temperature sensor 9 can be fed to the control and/or regulating device 16. The control and/or regulating device 16 can control and/or regulate at least one parameter of the printing process (such as, for example, printing speed, intensity of the microwave radiation, etc.) by means of the measured temperature. Upon passing through the microwave heating device 4, the filament 1 is heated in a controlled manner, optionally shaped by means of the print nozzle 8 and then applied to or deposited on the print surface 15 continuously and in a controlled manner. The filament 14 applied to the print surface 15 generally cools down quickly and adheres to the print surface 15.

FIG. 3 shows an exemplary microwave heating device. The microwave heating device comprises a resonator, such as a coaxial resonator, with an outer conductor 20 defining a cavity 19. A non-metallic tube 27, which partially or completely encloses the filament, passes through the cavity 19. The tube 27 can e.g. be a ceramic or quartz tube. The tube 27 is preferably transparent to the microwave radiation used. The tube 27 can serve to align and/or support the filament. Alternatively or in addition, the tube can serve as a heat insulator.

The microwave heating device can further comprise an additional heating device, such as an electric heating device. The additional heating device can additionally increase the surface temperature of the filament 1 in order to improve the printing process. The additional heating device can be arranged or formed e.g. in a portion of the tube 27 which is located outside the cavity 19.

The microwave energy is coupled into the resonator through a coaxial coupling pin 21, a coupling loop or alternatively through a waveguide 18 and 24.

Two microwave filters 25 and 26 are arranged at the filament inlet or in the vicinity thereof. Two microwave filters 22 and 23 are also arranged at the filament outlet or in the vicinity thereof. It is also possible to use more than two microwave filters. The two or more microwave filters 22 and 23 or 25 and 26 can have different filter characteristics, whereby improved and efficient microwave shielding can be achieved when the process parameters change.

The direction of the electric field in the resonator or in the cavity 19 can be different and e.g. orthogonal or parallel to the filament 1. The direction of the electric field can be selected or adjusted as a function of the microwave properties of the filament to be heated (electrically conductive or dielectric) by choosing a suitable resonator design with a corresponding field distribution. If the material of the filament has a low microwave absorption capacity, the orientation of the electric field parallel to the filament 1 is preferably selected. If the material has a higher microwave absorption capacity, in particular if the fibers used are electrically conductive, the direction of the field perpendicular to the filament 1 is preferably selected. Since the filament 1 moves continuously through the resonator or the cavity, it will pass through a plurality of field minima and maxima, depending on the resonator design, and thus heat up uniformly over time. Microwave radiation, which as a rule is relatively weak, can possibly exit the resonator.

FIG. 4 schematically shows an exemplary print nozzle 33 with a device for cutting the filament (filament cutting device). In the print nozzle 33 shown in FIG. 4, the filament cutting device consists of the blades 35 and 36 arranged on the left and right around the outlet of the print nozzle. The blades 35 and 36 can e.g. be made of metal or ceramic and can have sharp cutting edges. The blades 35 and 36 can be curved. The filament cutting device can also consist of a single blade that can be arranged in a ring around the entire circumference of the outlet of the print nozzle 33 (i.e. 360 degrees). It is also possible not to arrange the blade around the entire circumference of the outlet of the print nozzle, but only in portions (i.e. by less than 360 degrees).

The continuous filament 37 is conveyed into the cavity of the microwave heating device by means of the rollers 2 and 3 and is heated there. In the case of a composite material made of fiber composite material, the continuous filament 37 is heated to a temperature that corresponds to the gelation or reaction temperature of the resin or is higher than the melting temperature of the thermoplastic. The heated filament is conveyed into the print nozzle 33 and extruded onto the print surface 38 by means of the print nozzle 33. If a control and/or regulating device issues a cutting order during the printing process, the rollers 2 and 3 are first stopped and the position of the filament 37 is fixed. Then, the left blade 35 or, in the case of a single blade, the left side of the blade is brought into contact with the extruded filament 37 in order to cut it. In the example shown in FIG. 4, the left blade 35 or the left side of the blade cuts through the filament 37. However, it is possible to bring another blade (such as blade 36) or another side of the blade into contact with the extruded filament 37 and cut through it.

It is also possible to design the print nozzle 33 with a smooth outlet. The outlet of the print nozzle can also have a relatively large circular or ring-shaped bevel or chamfer. The diameter of the bevel can be two to three times larger than the diameter of the filament. The bevel can have a smooth, thin coating, e.g. a PTFE (polytetrafluoroethene) coating. The print nozzle 33 can also have a substantially flat portion on the outside of the nozzle surface, which is arranged opposite the print surface 38. The flat portion can e.g. contact the circular or annular bevel or be connected to it. The flat portion can in particular be the extension of the tangent of the circular or annular bevel. The flat portion can apply a compressive force to the filament to compress the filament.

In order to accelerate the printing process, a filament cooling device 42 can be provided for cooling the in particular pultruded filament exiting the print nozzle, as shown in FIG. 5. Compared to conventional thermally assisted additive manufacturing, the microwave printing device or the device for additive manufacturing by means of microwave heating, according to aspects of the invention, has a significantly more precise control and/or regulation of the temperature of the filament. For example, a composite filament made of T300 1 K carbon fiber-reinforced polylactide can be heated to a temperature of up to 250 degrees Celsius with the help of the microwave heating device. At a very high printing speed it can happen that the continuous filament does not cool down fast enough and thus does not adhere sufficiently to the print surface, especially in the case of printing by means of pultrusion. If the applied filament is not sufficiently firmly connected to the printed component, pultrusion can be difficult as the filament may be pulled away again from the component or from the desired application location. In order to cool the already printed filament, a suitable filament cooling device 42 can be used. The pultruded or extruded filament 44 can e.g. be made by means of a cooled fluid flow (e.g. gas flow) or by evaporation of liquid gas. Alternatively or in additional, the printing plate 45 can have one or more heat exchangers or heat transfer devices 46. The heat transfer can be fluid- or semiconductor-based, for example.

The temperature of the extruded filament can be measured by means of a thermal sensor 43, FIG. 6 shows a flow diagram illustrating an exemplary additive manufacturing process with the aid of the additive printing devices and systems described above. The filament can be made of a fiber-reinforced polymer composite material, for example. A CAD model is first created for the mold to be produced. A print path for microwave printing is generated on the basis of the CAD model (step S2).

The system for the additive manufacture of molds (additive printing device) is initialized and the microwave energy source is turned on (step S3). The initialization can include a coordinate calibration in which all axes of the additive printing device are moved to the starting point. The initialization can further include a check as to whether all the conditions and parameters are correctly set. Subsequently, heating of the filament is started (step S4). Here, as the microwave energy increases, the temperature fluctuation of the filament is monitored, preferably in real time. After the temperature of the filament has reached the target temperature (step S5), printing is started according to the print path.

Here, the hottest point of the filament is pressed into the print nozzle (step S6). When the filament's hottest point is in the print nozzle, the filament's position is maintained. In the next step, the extruded filament is applied to the print surface or printing plate and, if applicable, pressed in or compressed (step S7). The process of printing the filament is continued along the print path (step S8). If necessary, the filament is cut through (step S9). After the filament has been cut through, a check is made as to whether the printing process is terminated (step S10). If the printing process is not yet terminated, steps S5 to S9 are repeated. If the printing is terminated, the microwave printing device and the microwave source are switched off (step S11), and the printing process is terminated (step S12).

Preferably, the printing status and various parameters of the printing process are monitored in real time. If there is a warning, the microwave energy source and the microwave printing device are switched off immediately, so that damage to the system or failure of the manufacturing process can be avoided. If there is no warning, the printing process is completed along the print path and finally the manufacturing process is terminated.

FIG. 7 shows a flow diagram illustrating an exemplary method for creating or generating the print path, for example for a filament made of a fiber-reinforced polymer composite material. After the start of the method for creating the print path (step S20), a CAD model is first provided for the mold to be produced (step S21). The CAD model can e.g. be generated on the basis of design specifications or be obtained from a database with finished models. The CAD model includes e.g. dimensional parameters, material properties, forces, loads and/or stress restrictions and, where applicable, other parameters and boundary conditions. In a next step (step S22), the material of the filament is detected or specified. In the case of a filament made of a fiber-reinforced polymer, the material of the fiber and the material of the polymer are detected or specified. In the next step, the specifications for the loads or the forces acting are specified (step S23). Furthermore, further design specifications and boundary conditions can be defined (step S24).

These parameters are passed on to a print path calculation module for calculating a print path for the mold to be produced and/or to a stress distribution analysis module in order to calculate the stress direction and the stress magnitudes in the designed mold.

In the next step, the print path is generated or calculated (step S25). The print path can be generated with several layers or without layers (e.g. a 3D volume structure) (step S251). It is also possible to realize a mixture of the two types. Furthermore, the volume and/or the amount of the fiber can be predetermined of specified (step S252). The mold or parts of it to be produced can be simulated on the basis of the generated print path. Furthermore, an analysis of the stress (the magnitude and the direction) and/or the acting forces and/or the material thickness can be carried out (step S26). In a next step, it can be checked whether the design specifications (e.g. the design specifications for the stresses or forces) are being adhered to (step S27). It can also be checked whether there are errors or interferences. If the design specifications are not met and/or errors and interferences are present, a new print path is calculated or steps S25 to S27 are carried out again. If all design specifications are met and/or there are no errors and interferences, further control parameters for controlling and/or regulating the printing process are defined or added and a corresponding Gcode is generated (step S28). The printing process control mainly includes microwave control, motion control, fiber cutting, monitoring of the process and, where applicable, adapting the process. The control parameters can e.g. include the printing speed, temperature, travel path of the print head, precision compensation, etc. The method for creating or generating the print path is terminated in step S32.

The calculation of the print path (e.g. in a print path calculation module) can be carried out iteratively. The vectorial distribution of the stress or the acting forces in the mold to be produced can first be determined on the basis of a homogeneous distribution of the material. A filament alignment can be determined or specified on the basis of the determined stress or force distribution. The data is then passed on to the print path generation module in order to generate the print path. The calculated print path corresponds to a modified anisotropic material distribution. On the basis of this anisotropic material distribution, the vectorial distribution of the stress or the acting forces in the mold to be produced is recalculated, the filament alignment is redefined, and the print path is recalculated. This process can be repeated several times.

FIG. 8 shows an exemplary system for the additive manufacture of molds. The system comprises a CAD module 71 for specifying or generating a CAD model, a stress distribution analysis module 72, a print path generation module, a simulation module for print path simulation and interference checking, a Gcode generation module 75 and a printing process control module 76. The CAD model includes the dimensional parameters of the mold to be printed, material properties, loads, restrictions and possibly other design parameters. These parameters are passed on to the stress distribution analysis module 72 in order to calculate the stress directions and the stress magnitudes in the designed mold. First, a homogeneous material distribution is specified and then a model based on the load vectors in different areas is applied in order to specify the filament alignment. The data is then transmitted to the print path generation module 73 in order to generate the print path. This is followed by a recalculation in the stress distribution analysis module and a check of the stress distribution. The print path generation module 73 can generate a path with different layers or without layers (e.g. in the form of a spatial structure or volumetric) or a mixture of both. The next step is a virtual simulation of the print path in the simulation module 74 in order to check for errors and interferences. A Gcode file is then generated in the Gcode generation module 75. The Gcode file can e.g. include the movement path (751), the printing speed (752) and the precision compensation (751). The system further comprises a printing process control module 76. The printing process control mainly comprises the microwave control (761), the motion control (762), the control of the fiber cutting (763), the monitoring and, where applicable, the adjustment of the printing process (764) and alarm generation and processing (765).

FIG. 9a schematically shows an exemplary system for the additive manufacture of molds with an impregnation device 77 upstream of the microwave printing device. A continuous fiber (e.g. a carbon fiber) 78 is inserted into the impregnation device 77. The impregnation device 77 comprises a microwave heating device with a microwave resonance chamber 96. The microwave heating device can be designed similar to the microwave heating device described above. A microwave filter 99 with an opening for the fiber is arranged in front of the inlet of the fiber into the microwave resonance chamber 96. The microwave energy is coupled into the microwave resonance chamber 96 through a coupling pin or antenna 79. The fiber is brought together with an impregnation material (e.g. made of polymer) by means of a connector, such as a T-connector 83, and is heated. In order to avoid an arc discharge (arc) induced by the high electrical field between the carbon fibers, sizes or other insulating agents can be added to the impregnation material.

The impregnation material 80 (e.g. polymer material) is conveyed to the open inlet of the T-connector 83 by means of rollers 81 and 82. For example, in one example, the T-connector 83 can be made of silicon carbide and absorb the microwave energy. The T-connector 83 heats up due to the absorption of the microwave energy. The polymer material 80 melts upon contact with the heated area of the T-connector 83 and wets the fiber. In another example, the T-connector 83 (e.g. made of ceramic) can be transparent to the microwave radiation. The polymer present in the T-connector 83 can absorb the microwave energy and heat up until e.g. the melting temperature of the polymer is reached.

The temperature of the fiber and the T-connector is measured by temperature sensors 98 and 97. The impregnated fiber can be extruded by means of a pultrusion nozzle to form a pre-impregnated filament. By means of the pultrusion nozzle 95, the pre-impregnated filament can be given a specific shape and/or a specific fiber volume of the impregnated fiber. The pultrusion nozzle 95 can be formed from a material that is highly absorbent for microwave radiation. In this way, on the one hand, the temperature can be increased and, on the other hand, the leakage of microwave radiation from the impregnation device can be reduced or prevented. By means of the rollers 84 and 94, the filament can be drawn out of the pultrusion nozzle 95 and conveyed into the microwave printing device 93.

In some examples, the impregnation device 77 can be used not only for impregnation but also for printing.

The microwave printing device 93 can be any of the microwave printing devices described above. The microwave printing device 93 shown in FIG. 9a comprises a resonance chamber 91, two microwave filters 89 and 92, a microwave antenna for coupling microwave energy into the resonance chamber 91, and a temperature sensor 90 for measuring the temperature of the filament. It is also possible to measure the distribution of the temperature of the filament e.g. by means of several point sensors or by means of an infrared camera. If several point sensors are used, it is advantageous to find the hottest point and to measure or monitor its temperature continuously. The measured temperature or the distribution of the temperature can be used to control and/or regulate the printing process. The heated filament is extruded or pultruded through a print nozzle 87. The print nozzle 87 can be formed at least in part from a material that absorbs microwave energy, for example to avoid thermal losses in the heated filament.

FIG. 9b shows a schematic representation of an exemplary microwave heating device 4 with a coaxial resonator and an extrusion element (print nozzle 190) for extruding the filament 78 heated in the coaxial resonator. The microwave heating device 4 can be used in one of the systems for the additive manufacture of molds described above, for example.

The coaxial resonator has a resonance chamber 96 formed by an outer conductor 185, into which the microwave radiation is coupled by means of the microwave antenna or the coupling pin 79. The resonance chamber 96 can have a substantially cylindrical shape with a longitudinal axis.

The coaxial resonator further comprises an electrically conductive element 187 extending over part of the total length of the resonance chamber 96 and forming the inner conductor or part of the inner conductor of the coaxial resonator. In the example shown in FIG. 9b, the electrically conductive element 187 is formed in the vicinity of the filament outlet of the coaxial resonator. One end of the electrically conductive element 187 is electrically connected to the outer conductor 185. It is also possible to electrically connect both ends of the electrically conductive element 187 to the outer conductor 185. The electrically conductive element 187 is hollow inside to allow a passage of the filament through the electrically conductive element 187. The electrically conductive element 187 can e.g. be in the form of a hollow cylinder, the longitudinal axis of the cylinder substantially coinciding with the longitudinal axis of the resonance chamber 96.

The microwave heating device 4 further comprises a microwave filter 99 arranged in the vicinity of a filament inlet of the resonance chamber 96. The microwave filter 99 has a passageway (e.g. in the form of an opening) for the filament 78.

Furthermore, the microwave heating device 4 comprises a tube 188 made of a material transparent to the microwave radiation. The tube 188 extends along the entire length of the resonance chamber 96 from the filament inlet to the filament outlet. Here, the tube 188 also extends through the electrically conductive element 187. The tube 188 is arranged coaxially, the longitudinal axis of the tube 188 substantially coinciding with the longitudinal axis of the resonance chamber 96 and the electrically conductive element 187. The filament 78 extends along the longitudinal axis of the tube 188 and is enclosed by the tube. The tube 188 serves to align the filament 78 in the resonator or in the resonance chamber 96.

The microwave heating device 4 further comprises a non-contact temperature sensor 97 that measures the temperature of the filament 78 through an opening in the resonance chamber and the outer conductor 95 forming the resonance chamber. The non-contact temperature sensor 97 can be an infrared camera, for example.

The continuous filament 78 (e.g., made of a fiber-reinforced polymer or polymer material) passes through the microwave filter 99 and enters the coaxial resonance chamber 96 through the filament inlet. The filament 78 is conveyed through the resonance chamber 96 and exits the resonance chamber 96. The heated filament is then extruded through the print nozzle 190.

The filament 78 can be electrically conductive or electrically non-conductive. In a first example, the filament 78 is electrically conductive, with the electrically conductive filament 78 and the electrically conductive element 187 forming the inner conductor of the coaxial resonator. Upon passing through the resonance chamber 96, the filament 78 is heated by the microwave radiation coupled into the resonance chamber. In a second example, the filament 78 is not electrically conductive, so that the inner conductor of the coaxial resonator is formed solely by the electrically conductive element 187. In this example, the filament is also heated directly in the resonance chamber 96. The structure of the resonance chamber 96 in the two examples is basically the same or similar, wherein the frequency or the frequency range for which the resonance chamber is calculated and/or optimized can be different. As described above, the frequency depends on the length of the resonance chamber 96. The length of the resonance chamber 96 is preferably a resonance length that, in the case of a conductive filament, can be at least $\lambda/2$ or a multiple of $\lambda/2$ or, in the case of a non-conductive filament, can be at least $\lambda/4$ or an odd multiple of $\lambda/4$.

The resonance chamber 96 with the electrically conductive element 187, which is electrically connected at one end to the outer conductor 185 forming the resonance chamber 96, is a single-mode resonance chamber in which a TEM wave is excited. The electric field of the TEM wave is polarized in the direction perpendicular to the inner conductor, i.e. perpendicular to the longitudinal direction of the resonance chamber 96. The electric field has a maximum on the inner conductor and the filament and decreases proportionally to 1/r in the radial direction. In this way, a maximum depth of penetration of the filament and an effective absorption of the microwave energy in the filament can be achieved. Furthermore, uniform heating of the filament can be achieved.

The heated filament 78 exiting the resonance chamber 96 enters the print nozzle 190 and is extruded through the print nozzle 190. The print nozzle 190 is arranged at the filament outlet of the coaxial resonator or connected to the filament outlet of the coaxial resonator. In the example shown in FIG. 9b, the print nozzle 190 is an extrusion nozzle. The extrusion force can reduce the friction between the filament 78 and the print nozzle 190 and thus increase the printing speed and the printing capacity. The print nozzle 190 can further have an open port or entrance into which thermoplastic or polymer resin 186 is introduced. The thermoplastic or polymer resin 186 can be heated by the heated filament 78, by a microwave source, by resistance heating, or a combination thereof.

The inner surfaces of the print nozzle 190 can be at least partially coated or covered with a thermal insulation material (such as ceramic, PTFE, etc.) in order to minimize heat losses.

FIG. 10 shows exemplary cross sections of a printed filament. For example, if a circular continuous filament is used, the printed filament (parent filament) will generally have an elliptical cross section 100. The fiber or fiber reinforcement 101 is distributed within the filament. Depending on the specific application, the cross section of the filament can be changed using a pultrusion nozzle. Thus, a filament having a rectangular cross section 102, a U-shaped cross section 103, an L-shaped cross section 104, an I-shaped cross section 105 or a planar cross section 106 can be obtained. With such a filament having a non-circular or non-elliptical cross section, a special nozzle (e.g. a heating nozzle), such as the nozzle shown in FIG. 11, can be used. The print nozzle can be a curved nozzle 107, as shown in FIG. 11 top left. With the help of the curved print nozzle 107, the continuous filament can be applied smoothly to the print surface 110. The print nozzle 107 can have at least one groove 109. The at least one groove 109 can extend parallel to the axis of the print nozzle 110. This makes it possible to extrude or pultrude filaments with different cross-sectional shapes. FIG. 11 top right shows a cross section along the line A-A of the print nozzle 107. The filament can e.g. have a cross section whose shape is substantially rectangular with at least one flat side and at least one serrated side, which has a plurality of elliptical portions, as shown in FIG. 11 bottom right, hi the case of a zigzag course of the print path on the print surface, as shown in FIG. 11 bottom left, the elliptical portions of two adjacent filaments 114 and 115 overlap and interlock to form a compact composite print structure 116 substantially free of empty spaces. Since the flat sides of the filaments are arranged outward, a very smooth printed structure 116 without corrugation or curling can thus be realized.

FIG. 12 schematically shows an exemplary microwave printing device with several resonators, which enables uniform heating of the filament. Each of the resonators can have the structure described in connection with the previous figures. Preferably, each of the resonators is a coaxial resonator. The filament 132 is preferably formed from an electrically conductive material, for example a fiber-reinforced polymer composite such as a carbon fiber-reinforced PEEK composite. A microwave energy source (e.g. 500 W microwave energy source) is connected to a microwave applicator 125 (e.g. a 50 Ohm adapter) by means of a radio frequency cable. A coaxial coupling piece or coupling element 126 with the dimensions of a quarter wavelength reduces the reflection of the microwave radiation. The interior of the coaxial coupling piece or coupling element 126 can be filled with air. A support plate 127 (e.g. a polytetrafluoroethylene (PTFE) plate) fixes the position of the inner conductor.

The microwave printing device comprises a first coaxial resonator having a first resonance cavity 122 formed within a housing (e.g. made of metal). The microwave printing device further comprises a second coaxial resonator having a second resonance cavity 119 formed within a tube (e.g. made of metal). The first resonance cavity 122 and the second resonance cavity are connected to one another and have a common longitudinal axis. The filament 132 extends centrally along the longitudinal axis through the two resonance cavities 119 and 122. The resonance cavities 119 and 122 can be filled with air or some other gas. A tube 133 made of brass or another suitable conductive material extends through the first resonance cavity 122 and constitutes the inner conductor (inner conductor) of the first resonance cavity 122. The interior of the brass tube 133 also forms the resonance cavity of a third coaxial resonator (i.e. the brass tube 133 forms the outer conductor of the third coaxial resonator). A tube 131 made of quartz or another material transparent to the microwave radiation is optionally arranged inside the brass tube 133. The quartz tube 131 (filament fixing device) extends over the entire first resonance cavity 122 and optionally over the entire second resonance cavity 119 and fixes the filament 132 in a central position (substantially along the longitudinal axis). The electrically conductive filament 132 serves as an inner conductor of the third coaxial resonator and the second coaxial resonator. A high intensity of the electric field can be realized in the third resonance cavity. This enables fast and uniform heating of the filament 132.

The broadband microwave filters 117, 118, 129 and 130, which are preferably filled with ceramic plates, shield the resonance cavities.

The microwave energy is coupled into the first resonance cavity 122. Most of the microwave energy transfer follows the wave 124, wherein at the contact portion between the first resonance cavity 122 and the third resonance cavity the microwave energy is split into two. The first resonance cavity 122 serves to couple the microwave energy into the second resonance cavity 119 and into the third resonance cavity 133.

The filament 132 is heated in the second resonance cavity 119 and the third resonance cavity 133. In order to compensate for a frequency shift due to the dielectric properties changing with the rise in temperature, an adaptation device 121 can be used, wherein the length of the adaptation device 121, which projects into the first resonance cavity 122, can be varied or adjusted. The adaptation device 121 is designed as a metallic tube electrically connected to the resonance cavities 122 and 119. Furthermore, the length of the tube 120 and thus the length of the second cavity 119 can also be variable or adjustable.

The microwave printing device can be attached to a multi-axis CNC machine or a robot arm, as described above. The energy, frequency and/or phase of the microwave radiation can be changed in order to achieve a uniform temperature distribution along the filament.

FIG. 13 schematically shows a further exemplary microwave printing device with a microwave heater. The continuous filament 134 can be made from a fiber-reinforced polymer composite, such as a nylon-carbon kevlar fiber-reinforced composite. The nylon-carbon material can be a mixture of pure nylon with chopped carbon fiber. The microwave printing device comprises a housing (e.g. made of metal) in which a cavity 141 is formed. The cavity 141 can be filled e.g. with air or another suitable gas. The filament 134 extends across the resonance cavity 141 and is heated upon passing through the cavity 141. The cavity 141 thus represents a heating cavity. The microwave printing device comprises a print nozzle 135 arranged at the outlet for the filament of the resonance cavity 141. The print nozzle 135 can be formed from ceramic, glass, or some other material with smooth inner surfaces. The print nozzle 135 may further comprise an additional heating device, such as an electrical heating device. With the additional heating device, the surface temperature of the filament 134 heated in the cavity 141 by means of microwave radiation can be increased in order to further improve the printing process in this way.

The microwave radiation is coupled into the cavity 141 by means of the coaxial cable 139. The inner conductor 140 of the coaxial cable 139 is connected to the ring 143. The ring 143 is part of a hollow inner conductor 142 arranged centrally in the cavity 141. The cavity 141 and the inner conductor 142 have a common longitudinal axis along which the filament extends. The continuous filament, the inner conductor 142, and the cavity 141 thus form a coaxial resonator.

Two microwave filters 144 and 146, which are preferably filled with dielectric plates (e.g. made of ceramic), are used to reduce or prevent the leakage of microwave radiation from the resonator.

The continuous filament 134 is heated in the vicinity of the microwave filter 146. The main path of microwave energy transfer follows the curved line 145. The temperature of filament 134 is measured by a sensor 138 (e.g. a pyrometer). The infrared radiation emitted by the filament passes through openings in the inner conductor 142 and the housing and is detected by the sensor 138. With a pyrometer, the temperature can be measured precisely, even if the filament is moving at a high speed.

By changing the size of the print nozzle 135, the diameter of the extruded filament can be changed or adjusted. The print nozzle 135 can have different shapes. Possible examples are shown in FIG. 13. For example, depending on the use, it is possible to switch between a straight print nozzle 147 with a larger inner diameter, a straight print nozzle 148 with a smaller inner diameter, and a curved nozzle 149.

The length of the inner conductor 142 is preferably adjustable in order to be able to adjust or tune the entire resonator or to match it to the frequency of the microwave radiation. As an alternative or in addition to adjusting or tuning the resonator, a tunable microwave source can be used. In this case, the frequency of the microwave radiation is matched to the resonance frequency of the resonator. Depending on the filament cross section, the printing speed and/or the filament temperature to be achieved, the microwave power can be in the range from a few watts to a few KW. The frequency of the microwave radiation can be in the range from 300 MHz to 6.0 GHz. Other values are also possible. The strength, frequency and/or phase of the microwave radiation can be variable or adjustable in order to maximize the efficiency of the energy transfer into the resonator and thus into the filament.

FIG. 14 shows an example of a print path for a rectangular mold with an opening in the center. The continuous filament has a very good edge offset and good copying properties. The print path continues in a spiral until the turning space becomes too small to support the filament (such as in area 154). Based on a stress analysis, the greatest stresses occur in the area of the opening. As a result, in the area 152 around the opening 155, the filament density is continuously increased from a normal to a high value in order to ensure a continuous reinforcement of the opening 155 and to increase the strength of the opening 155. It is necessary to cut the filament in the turning area 154.

The mold also has two edge areas 150 and 153 that can be cut off after printing.

It is possible to provide an additional print path 157 in order to avoid cutting the filament. The additional print path 157 allows enlarging the turning area 154. Furthermore, the print path can only have a starting point and an end point. The print path 156 is provided in such a way that the print trajectory changes gradually.

The mold is subjected to a load perpendicular to the two short sides as in a tensile strength test. According to a stress analysis method, it is advantageous to provide different types of print trajectories. The print trajectories can include e.g. a rectangular trajectory 158, a rectangular trajectory with arcs 159, a circular tracking with two or more concentric circles 160, a semicircular trajectory 161, and a unidirectional circular trajectory 162. In order to achieve a high mechanical strength of the mold, it is advantageous to use the paths 158 and 159.

FIG. 15 shows the external shape of an exemplary microwave printing device. The microwave input from a flexible cable (not shown) is e.g. connected to the coaxial coupler 171 with an N-type mounting socket (adapter 170). The resonant microwave radiation fills the space defined by the resonance cavity 172 and the coupling tube 173 up to the microwave filter 174. The resonance cavity 172 and the coupling pipe 173 preferably have atmospheric air inside. Microwave filters with envelopes 174, 175, 176 and 177 made of metal prevent the leakage of microwave radiation. The matrix material and the fiber material are mixed into the element 178 and the mixing device 178, respectively. The mixing device 178 can further comprise an additional heating device, such as an electrical heating device. The fibers preferably pass through the microwave printing device over the entire length from the fiber inlet 179 to the end of the print nozzle 181. The impregnation process preferably takes place from the element 178 to the element 180. The element 180 and/or the print nozzle 181 can furthermore comprise an additional heating device, which allows compensating for the heat losses via the surface of the filament upon passing through the microwave printing device. The position of the adaptation device 173 on the axis of the resonator is adjustable in order to create the resonance conditions in the microwave printing device. The fixing rings 183 or the fixing element 182 are used to fix the position of the adapter element 173.

In the above examples, the use of a resonator makes it possible to realize a spatial distribution of the standing waves of the microwave radiation formed in the resonator, which enables a particularly advantageous, preferably uniform heating of the filament. At the same time, the leakage of potentially harmful microwave radiation can be significantly reduced. This improves the safety of the microwave printing device and maximizes the absorption of microwave radiation by the filament. It is also possible to make the microwave printing device more compact and smaller, since additional shielding of the microwave printing device can be dispensed with.

The filament can be an electrically conductive or an electrically non-conductive filament. In the case of an electrically conductive filament, the filament serves as an inner conductor of a coaxial resonator, so that the polarization direction of the electric field in the resonator is perpendicular to the axial direction of the filament. The microwave radiation can thus better penetrate into the material of the filament and heat it inside and outside. Depending on the fiber properties, the fiber volume content and the diameter of the filament, a uniform temperature distribution can be achieved even at high printing speeds. Due to the even temperature distribution, the bond strength between fibers and matrix material can be improved. This also allows pre-impregnation supported by microwaves based on the same principle prior to the extrusion or pultrusion, which ultimately leads to a high mechanical strength of the printed parts.

Furthermore, the use of at least two microwave filters makes it possible to prevent or reduce the leakage of microwave radiation from the microwave printing device even with an electrically conductive filament, so that the safety of this microwave printing device can be improved and the absorption of the microwave radiation by the filament can also be maximized. Furthermore, in this way, the size of the microwave printing device or of an additive printing device can be reduced overall, since a chamber shielding the entire microwave printing device is not necessary.

By pultrusion of the fibers and the matrix material of the fiber composite material before the filament is provided at the inlet of the microwave printing device according to one embodiment, a filament with a high proportion of fibers and low porosity can be provided.

The microwave heating device can also easily be combined with other devices, for example with an additional heating device, whereby a hybrid system can be realized.

REFERENCE NUMERAL LIST 1 filament
2, 3 rollers
4 microwave heating device
5 microwave antenna
6 microwave filter
7 filament cutting device
8 print nozzle
9 temperature sensor
11 cavity (resonance cavity or resonance chamber)
12 microwave filters
13 filament inlet opening
14 extruded filament
15 print surface
16 control and/or regulating device
18, 24 waveguides
19 cavity resonator
20 outer conductor
21 coupling pin
22, 23, 25, 26 microwave filters
27 tube
28-31 directions of the electric field
33 print nozzle
35, 36 blade
37 filament
38 print surface
42 filament cooling device
43 temperature sensor
44 extruded filament
45 print plate
46 heat exchanger or heat transfer device
71 CAD module for specifying or generating a CAD model
72 stress distribution analysis module
73 print path generation module
74 simulation module for print path simulation and interference check
75 Gcode generation module
751 movement path
752 printing speed
753 precision compensation
76 printing process control
761 microwave control
762 motion control
763 fiber cutting
764 monitoring and optionally adjusting the printing process
765 alarm generation and processing
77 impregnation device
78 filament
79 coupling pin
80 impregnation material
81, 82 rollers
84, 94 rollers
83 T-connector
87 print nozzle
89, 92, 99 microwave filters
90 temperature sensor
91 resonance chamber
93 microwave printing device
95 pultrusion nozzle
96 resonance chamber
97, 98 temperature sensors
99 microwave filter
100-106 cross sections of a filament
107 print nozzle
109 groove
110 print surface
114, 115 filament
116 print structure
117, 118 microwave filters
119, 122 cavity
125 microwave applicator (e.g. adapter)
126 coupling piece or coupling element
127 support plate
129, 130 microwave filters
131 quartz tube
132, 134 filament
133 brass tube
135 print nozzle
138 temperature sensor
139 coaxial cable
141 cavity
142 inner conductor
143 ring
144, 146 microwave filters
147-149 print nozzle
150, 153 edge area 152 area with continuously changing filament density
154 turning area
155 opening
156 print path
157 additional print path
158-162 print trajectories
170 adapter
171 coupling piece
172 resonance cavity
173 coupling tube
174-177 microwave filter envelopes made of metal
178 element
179 fiber inlet
180 element
181 print nozzle
182 adaptation device
183 fixing rings
185 outer conductor
186 thermoplastic or polymer resin
187 electrically conductive element
188 tube made of a material transparent to microwave radiation
190 print nozzle
210 microwave printing device
220 slide block
230 microwave energy source with amplifier
240 pultrusion device
250 filament drawing device
260 filament
270 flexible cable
280 motor
290 linear guide screw
300 print platform
320 fixation block
330 motion control device
340 touch screen
S1 start of the printing process
S2 creation of a CAD model
S3 initialization of the additive printing device and switching on the microwave energy source
S4 start of filament heating
S5 reaching the target temperature of the filament and start of printing
S6 pressing the heated filament into the print nozzle
S7 applying the extruded filament to the print surface
S8 printing the filament along the print path
S9 cutting through the filament
S10 checking whether the printing is terminated
S11 switching off the microwave printing device and the microwave source
312 end of printing
320 start of the creation of a print path
S21 providing a CAD model for the mold to be produced
S22 detecting the material of the filament
S23 specifying loads or forces
S24 specifying further design specifications or boundary conditions
S25 generating a print path
S251 generating a print path with and/or without layers
S252 generating a print path for a predetermined amount and/or a predetermined volume of the fiber
S26 simulation and stress analysis
S27 checking compliance with the design specifications
S28 generating Gcode
S29 terminating the creation of a print path

The invention claimed is:

1. A microwave printing device, comprising:
   an inlet for a filament;
   an outlet for the filament; and
   a microwave heating device for heating the filament using microwave radiation,
   wherein the microwave heating device comprises at least one coaxial resonator configured to provide resonant microwave radiation for heating the filament, and
   wherein the coaxial resonator is formed by an outer conductor, which forms a cavity, and a coaxial inner conductor, and comprises a microwave radiation input for coupling in microwave radiation.

2. The microwave printing device according to claim 1, further comprising at least one print nozzle for extruding or pultruding the heated filament.

3. The microwave printing device according to claim 2, wherein the print nozzle is at least partially transparent to the resonant microwave radiation; and/or wherein the print nozzle is designed to change the cross-section of the filament; and/or wherein the print nozzle comprises a cutting device for cutting through the extruded or pultruded filament.

4. The microwave printing device according to claim 1, wherein the filament is electrically conductive and forms the inner conductor of the coaxial resonator or a part of an inner conductor of the coaxial resonator.

5. The microwave printing device according to claim 1, further comprising at least two microwave filters for reducing or preventing the resonant microwave radiation from exiting the coaxial resonator, each of the microwave filters having a passageway for the filament.

6. The microwave printing device according to claim 1, wherein the microwave heating device comprises a plurality of coaxial resonators; and/or wherein the microwave printing device has a plurality of regions with different temperatures.

7. The microwave printing device according to claim 1, wherein the microwave printing device comprises a first coaxial resonator, a second coaxial resonator, and a third coaxial resonator, wherein the first coaxial resonator is connected to the second coaxial resonator, with a longitudinal axis of the first coaxial resonator and a longitudinal axis of the second coaxial resonator being parallel and forming a common longitudinal axis; and the third coaxial resonator is arranged concentrically within the first coaxial resonator, with an inner conductor of the first coaxial resonator forming an outer conductor of the third coaxial resonator.

8. The microwave printing device according to claim 1, wherein the inlet for the filament comprises at least one inlet for at least one fiber and one inlet for a matrix material of a fiber composite.

9. The microwave printing device according to claim 1, further comprising a pultrusion device for forming the filament; and/or a filament fixing device for fixing the filament at a specific position in the coaxial resonator.

10. The microwave printing device according to claim 1, wherein the resonant microwave radiation has a frequency in a range from 300 MHz to 30 GHz; and/or a power in a range from 1 W to 10 kW.

11. The microwave printing device according to claim 1, further comprising at least one second heating device for heating the filament and/or for heating a surface of the filament in a print nozzle located at an exit of the microwave printing device.

12. A system for additive manufacture of a mold, the system comprising:
- a microwave printing device, comprising:
  - an inlet for a filament;
  - an outlet for the filament; and
  - a microwave heating device for heating the filament using microwave radiation,
  - wherein the microwave heating device comprises at least one coaxial resonator configured to provide resonant microwave radiation for heating the filament, and wherein the coaxial resonator is formed by an outer conductor, which forms a cavity, and a coaxial inner conductor, and comprises a microwave radiation input for coupling in microwave radiation;
- a print platform;
- a moving device for moving the microwave printing device and/or the print platform relative to one another; and
- a control and/or regulating device for controlling and/or regulating a printing process.

13. A method for the additive manufacture of a mold using microwave radiation, the method comprising:
- providing a filament at an inlet of a microwave printing device, the microwave printing device comprising at least one coaxial resonator configured to provide resonant microwave radiation;
- heating the filament in the coaxial resonator using the resonant microwave radiation; and
- printing the heated filament to form the mold.

14. The method according to claim 13, wherein the filament is electrically conductive and forms the coaxial inner conductor of the coaxial resonator or forms a part of the coaxial inner conductor of the coaxial resonator.

15. The method according to claim 13, wherein the filament is formed from a fiber composite material comprising at least one fiber and a matrix material.

16. The method according to claim 15,
- wherein the at least one fiber is a carbon fiber, graphite fiber, metal fiber, glass fiber, plastic fiber, ceramic fiber, boron fiber, steel fiber, or stone fiber; and/or
- wherein the at least one fiber is a continuous fiber.

17. The method according to claim 15, further comprising pultruding the fiber and the matrix material of the fiber composite material prior to providing the filament at the inlet of the microwave printing device.

18. The method according to claim 13, wherein the microwave printing device comprises:
- the inlet for the filament;
- an outlet for the filament; and
- a microwave heating device,
  - wherein the microwave heating device comprises the at least one coaxial resonator, and
  - wherein the coaxial resonator is formed by an outer conductor, which forms a cavity, and a coaxial inner conductor, and comprises a microwave radiation input for coupling in microwave radiation.

* * * * *